United States Patent [19]
Herkenrath et al.

[11] Patent Number: 5,650,902
[45] Date of Patent: Jul. 22, 1997

[54] SUBSTATION FOR THE DISTRIBUTION OF ELECTRICAL ENERGY PROTECTED AGAINST ARCING FAULTS

[75] Inventors: Manfred Herkenrath, Siegburg; Paul Wey, Bonn; Ferenc Boros, Neunkirchen-Seelscheid; Dietrich Stade, Ilmenau; Holger Schau, Kranichfeld, all of Germany

[73] Assignee: Klockner-Moeller GmbH, Bonn, Germany

[21] Appl. No.: 444,620

[22] Filed: May 19, 1995

Related U.S. Application Data

[63] Continuation-in-part of PCT/DE94/01077, Sep. 17, 1994

[30] Foreign Application Priority Data

Sep. 21, 1993 [DE] Germany ............ 43 31 992.0

[51] Int. Cl.⁶ .................. H01H 9/56; H01H 9/30
[52] U.S. Cl. .................. 361/13; 361/5; 361/63
[58] Field of Search .............. 250/227; 307/117; 324/28, 96, 415, 424; 340/248, 578, 644; 361/2, 3, 5, 8, 13, 54, 57, 62, 63

[56] References Cited

U.S. PATENT DOCUMENTS

| 3,675,079 | 7/1972 | Labbaye et al. | 361/8 |
| 4,184,186 | 1/1980 | Barkan | 361/10 |

FOREIGN PATENT DOCUMENTS

| 0575932 | 12/1993 | European Pat. Off. | H02B 13/065 |
| 0676174 | 12/1990 | Switzerland | H02H 7/22 |
| 8808217 | 10/1988 | WIPO | H02H 7/22 |

*Primary Examiner*—Jeffrey A. Gaffin
*Assistant Examiner*—Ronald W. Leja
*Attorney, Agent, or Firm*—Nils H. Ljungman and Associates

[57] ABSTRACT

Substation for the distribution of electrical energy, and protected against arcing faults, characterized by the fact that Hall-effect sensors and additional optical fiber conductors are provided as sensors, whereby the Hall-effect sensors are logically AND linked with the optical fiber conductors.

7 Claims, 17 Drawing Sheets

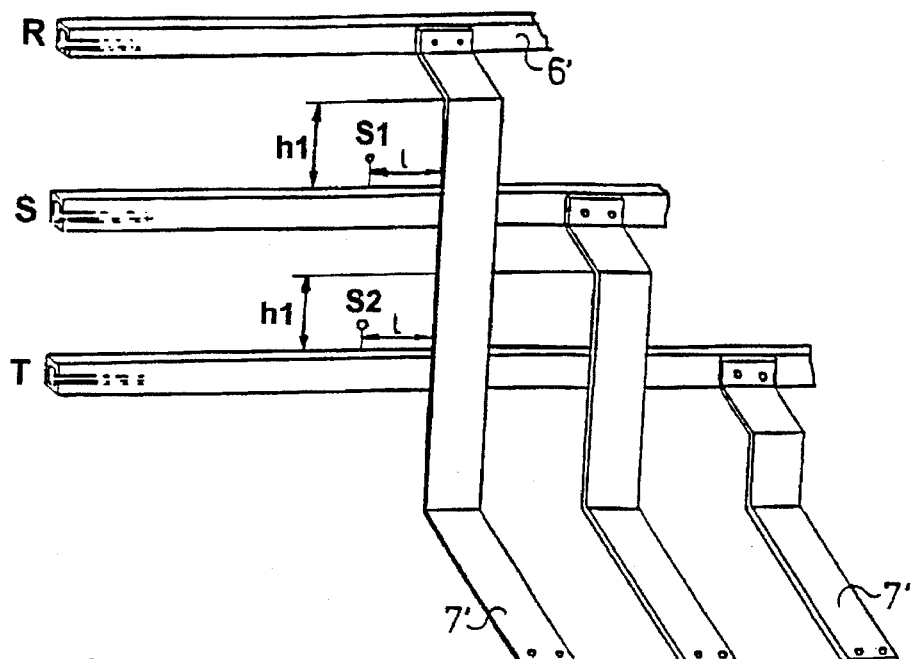
*Fig.13*
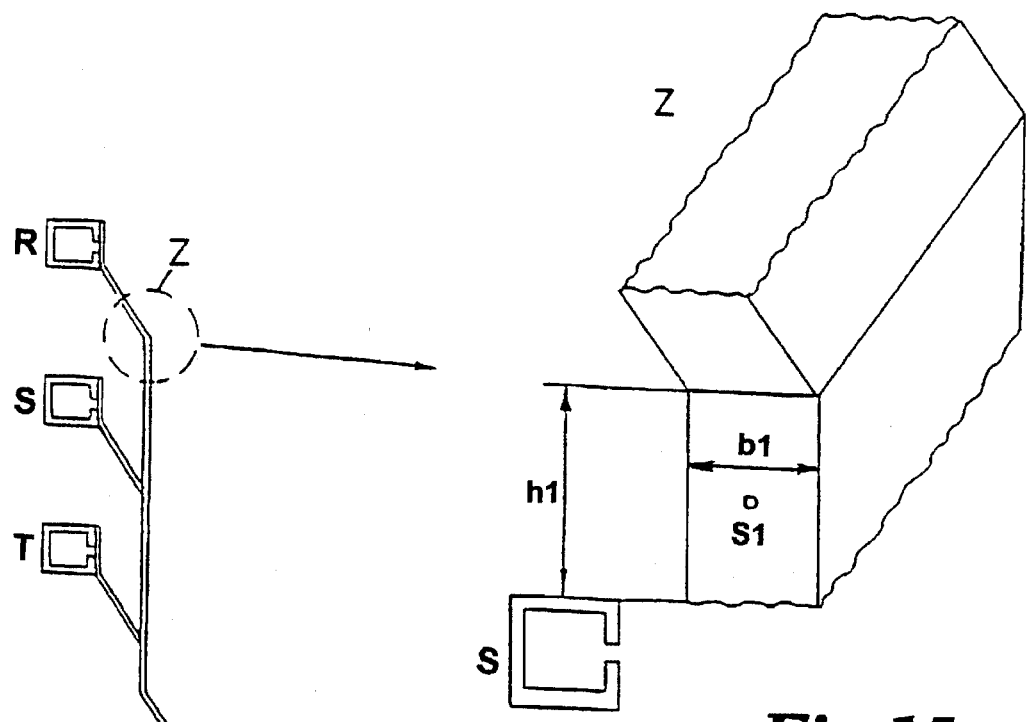
*Fig.14*
*Fig.15*

1

SUBSTATION FOR THE DISTRIBUTION OF ELECTRICAL ENERGY PROTECTED AGAINST ARCING FAULTS

CROSS-REFERENCE TO RELATED APPLICATION

The present application is a Continuation-in-Part Application of International Patent Application No. PCT/DE94/01077, filed on Sep. 17, 1994, which itself claims priority from Federal Republic of Germany Patent Application No. P 43 31 992, filed on Sep. 21, 1993. International Patent Application No. PCT/DE94/01077 was pending as of the filing date of the present application, and designated the U.S.A. as a designated state.

BACKGROUND OF THE INVENTION

1. Field of the Invention

This invention relates to a substation (for the distribution of electrical energy) protected against arcing faults, i.e. accidental arcs.

2. Background Information

Arcing faults tend to occur, e.g. in low voltage substations, when a direct electrical connection is created between the conductors or between a conductor and ground, without the presence of a dead short circuit, e.g. if the insulation is penetrated or as a result of incorrect operation. The live parts at different potentials are thereby bridged by a plasma column.

On account of the very high temperature of the plasma, the immediate vicinity of the arc is severely heated, and consequently the pressure in the substation increases so rapidly that it reaches its maximum in as little as 15 to 20 ms (milliseconds). The pressure stress is frequently greater than the mechanical strength of the doors and partitions of the switchgear cabinets. These parts then explode and their parts blow out at high velocities.

If people are in the vicinity, they can be severely burned by the hot gases and hot parts. The radiation caused by the plasma column can also cause electro-ophthalmia, i.e. the burning of the eyes caused by the UV radiation generated by an electrical arc.

Swiss Patent No. 676 174 discloses a device to detect arcing faults, and this device uses an optical fiber conductor sensor to detect an arc in a substation. The arc detector thereby extends through several switchgear cells. This device transmits an error message regardless of the point of origin of the arcing fault.

One disadvantage of the arrangement disclosed in the aforementioned Swiss patent is that in the event of an arcing fault, it is not possible to perform selective disconnects from the supply, e.g. by continuing to supply power to consumers by means of reserve incoming supplies. Further, it is not disclosed how arcing faults which do not last longer than a specified time, e.g. 5 ms, can be extinguished so that a selective short circuit protection is not adversely affected.

The publication "Elektrotechnik 1982", Volume 6, pp. 23–27, in particular its FIG. 5, and Hungarian Patent Application No. 169 992 disclose a high-speed grounding switch which, it is claimed, will extinguish an arcing fault in less than 5 ms. FIG. 6 of the "Electrotechnik" publication illustrates a power network with a reserve supply, in which the use of the high-speed grounding switch is described.

In the event of an arcing fault, e.g. in the primary feed, the high-speed grounding switch is actuated in every case. Of course, people in the area are reliably protected, but it cannot be considered acceptable that, in areas where the power supply must be very reliable, entire areas served would have to be without power for rather long periods of time, e.g. on account of false tripping caused by interference from light from external sources or arcing faults upstream of the incoming feeder circuit breaker.

Heretofore, the field of the invention includes numerous guidelines, patent literature, articles in the technical press and miscellaneous publications on the topic of "protection against arcing faults". However, in spite of numerous proposed solutions, the number of accidents has increased significantly since the 1960s.

OBJECT OF THE INVENTION

The object of the present invention is therefore to find an economically acceptable solution to increase the safety of a substation, so that arcing faults can be detected reliably and rapidly, without the risk of faulty tripping and danger to persons or other parts of the system, and to limit the effects of arcing faults in an economically reasonable manner. In particular, the object of the invention is to retain selectivity in short circuits and overcurrents and to keep the security of the power supply high.

SUMMARY OF THE INVENTION

The above object is achieved, in accordance with at least one preferred embodiment of the present invention, by means of Hall-effect sensors and additional optical fiber conductors provided as sensors, whereby the Hall-effect sensors can preferably be logically AND linked with the optical fiber conductors.

Other particularly advantageous refinements of the present invention are disclosed herebelow.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

In summary, one aspect of the invention resides broadly in a substation for the distribution of electrical power, the substation comprising: means for receiving electrical power from at least one source; means for outputting electrical power to at least one destination; means for delivering electrical power from the receiving means to the outputting means; the substation having at least one possible locus, among the receiving means, the outputting means and the delivering means, for the inadvertent generation of an arc; means for detecting an inadvertently generated arc; means, responsive to the detecting means, for extinguishing an inadvertently generated arc; the detecting means comprising a first set of at least one sensor and a second set of at least one sensor; and at least one sensor of the first set of at least one sensor being logically "AND" linked with at least one sensor of the second set of at least one sensor, to provide a signal to the extinguishing means to extinguish an inadvertently generated arc.

Another aspect of the invention resides broadly in a substation for the distribution of electrical power, the substation comprising: means for receiving electrical power from at least one source; means for outputting electrical power to at least one destination; means for delivering electrical power from the receiving means to the outputting means; at least one possible locus for the inadvertent generation of an arc; means for detecting and extinguishing and inadvertently generated arc; the detecting means comprising a first set of at least one sensor and a second set of at least one sensor, the first set of at least one sensor and second set of at least one sensor being separate and distinct from one another; and the first set of at least one sensor and the second set of at least one sensor having means for interacting with one another to produce a signal to extinguish an inadvertently generated arc.

BRIEF DESCRIPTION OF THE DRAWINGS

The invention, additional configurations and improvements of the invention and additional advantages are described and explained below with reference to the embodiments illustrated in the accompanying drawings, wherein:

FIG. 13 is an illustration of a system of bus bars with outgoing bus bars and Hall-effect sensors, from the front, FIG. 14 is an illustration of the system of bus bars illustrated in FIG. 13, from the side, FIG. 15 is a detail Z of the system of bus bars illustrated FIG. 14.

DESCRIPTION OF THE PREFERRED EMBODIMENT

Figure 1:
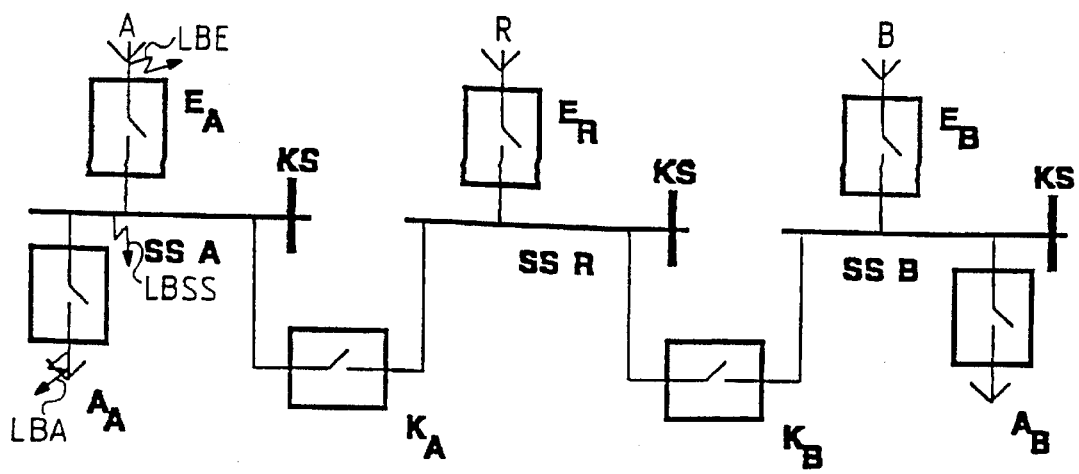
FIG. 1 is the single-line current diagram of the substation illustrated in FIG. 2.
Figure 2:
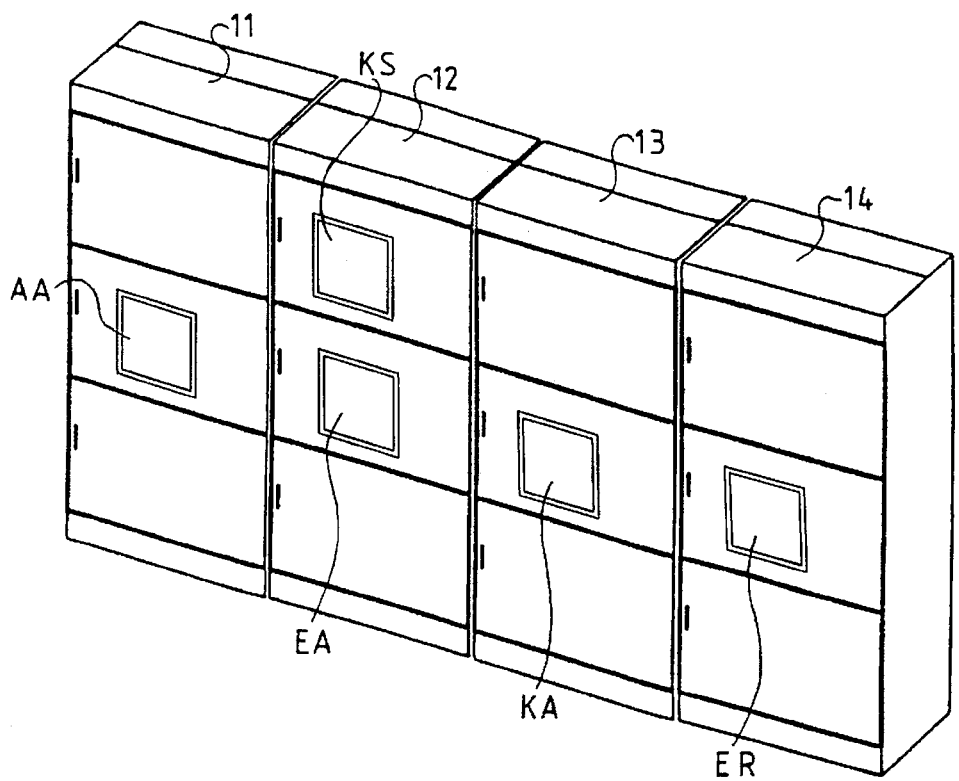
FIG. 2 is a perspective view of a detail of a low voltage substation.

With reference now to FIGS. 1 and 2, the substation 1 preferably includes a first incoming supply A, a second incoming supply B and a reserve incoming supply R, as indicated by the corresponding current diagram of FIG. 1.

Upstream of the spare feed there is preferably a reserve transformer which takes over the power supply in the event of the failure of one of the two incoming supplies A or B, by activating a bus coupler circuit breaker.

The substation 1 also preferably includes three bus bar segments SSA, SSR and SSB, each of which can be fed by an incoming feeder circuit breaker EA, ER and EB. The bus bar segments SSA and SSR, as well as SSR and SSB, are preferably connected to one another by means of bus coupler circuit breakers.

Preferably connected to the bus bar segment SSA is a first outgoing switch AA, although naturally there can also be more than one output or outgoing circuit breaker, e.g. to supply power to several heaters or other media receiving electrical power.

A second outgoing circuit breaker AB is preferably connected to the second bus bar segment SSB, e.g. to supply power to an independent distribution panel.

Figure 3:
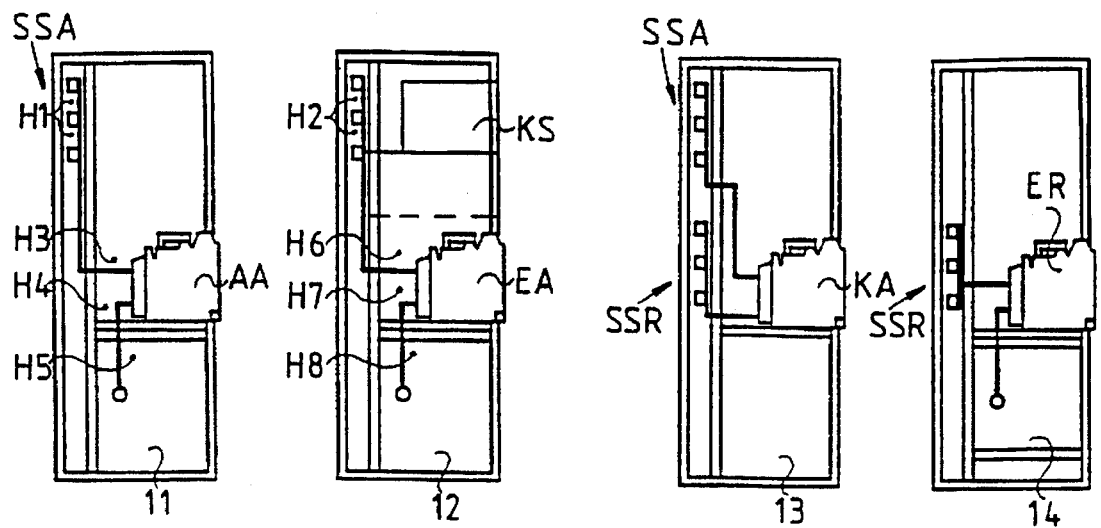
FIG. 3 is a view of the interior of the individual fields from the side.
Figure 4:
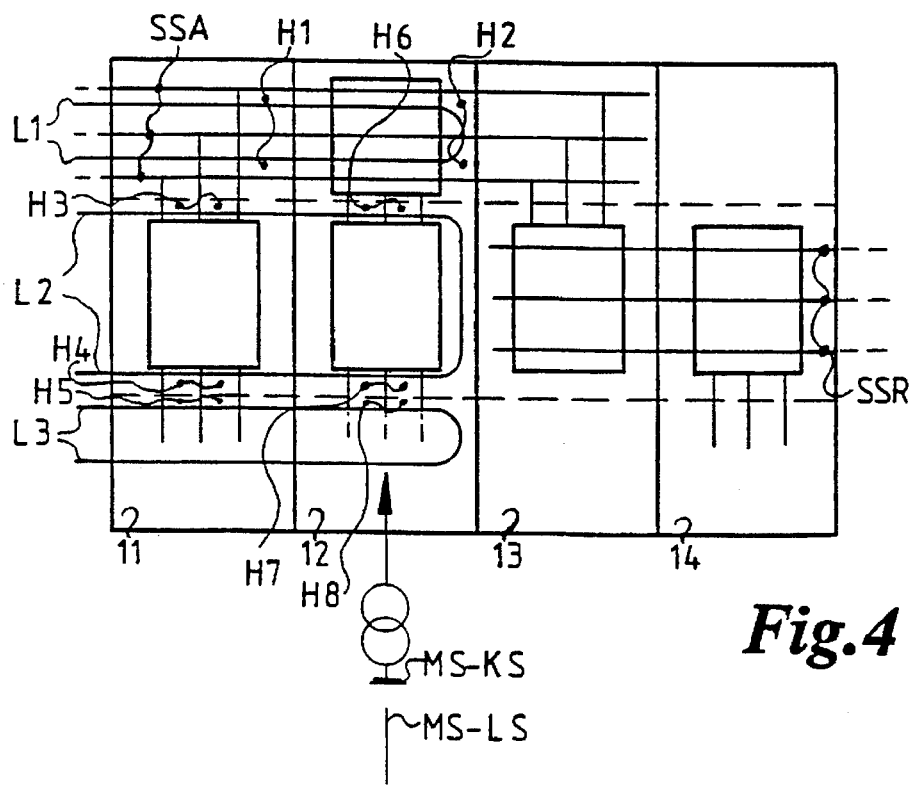
FIG. 4 is a schematic diagram of the bus bar and equipment layout, from the front.

FIG. 2 shows a detail of four cabinets 11 to 14 of the substation 1, whereby FIGS. 3 and 4 show additional views of these four cabinets 11 to 14.

The first cabinet 11 preferably contains the first outgoing circuit breaker AA. The first incoming supply circuit breaker EA and a high-speed grounding switch, which will be explained in greater detail below, are preferably located in the second cabinet 12. The third cabinet 13 preferably contains the bus coupler circuit breaker KA, and the fourth cabinet preferably contains the incoming supply circuit breaker ER of the reserve incoming supply R.

As shown in FIG. 4, the bus bars of incoming supply A in the upper portion preferably extend over at least the first three cabinets 11 to 13. Additional outgoing circuit breakers can be located to the left of cabinet 11 and supply A, if these bus bars are extended to the left, as indicated by the broken lines.

The bus bars of the reserve incoming supply R, on the other hand, are preferably located in the middle area, in the third and fourth cabinets 13, 14, and conceivably to the right of these cabinets.

The substation is preferably equipped with Hall-effect sensors and optical fiber sensors to detect arcing faults. The operation of these sensors is described in greater detail below.

The optical fiber sensors are preferably used for the overall detection of arcing faults (without regard to specific location, at least in identical functional spaces), i.e. they preferably indicate that an arcing fault has occurred, while the Hall-effect sensors preferably detect the exact spot where the arcing fault has occurred.

The detection of arcing faults can preferably be done for each switchgear bay.

Figure 5:
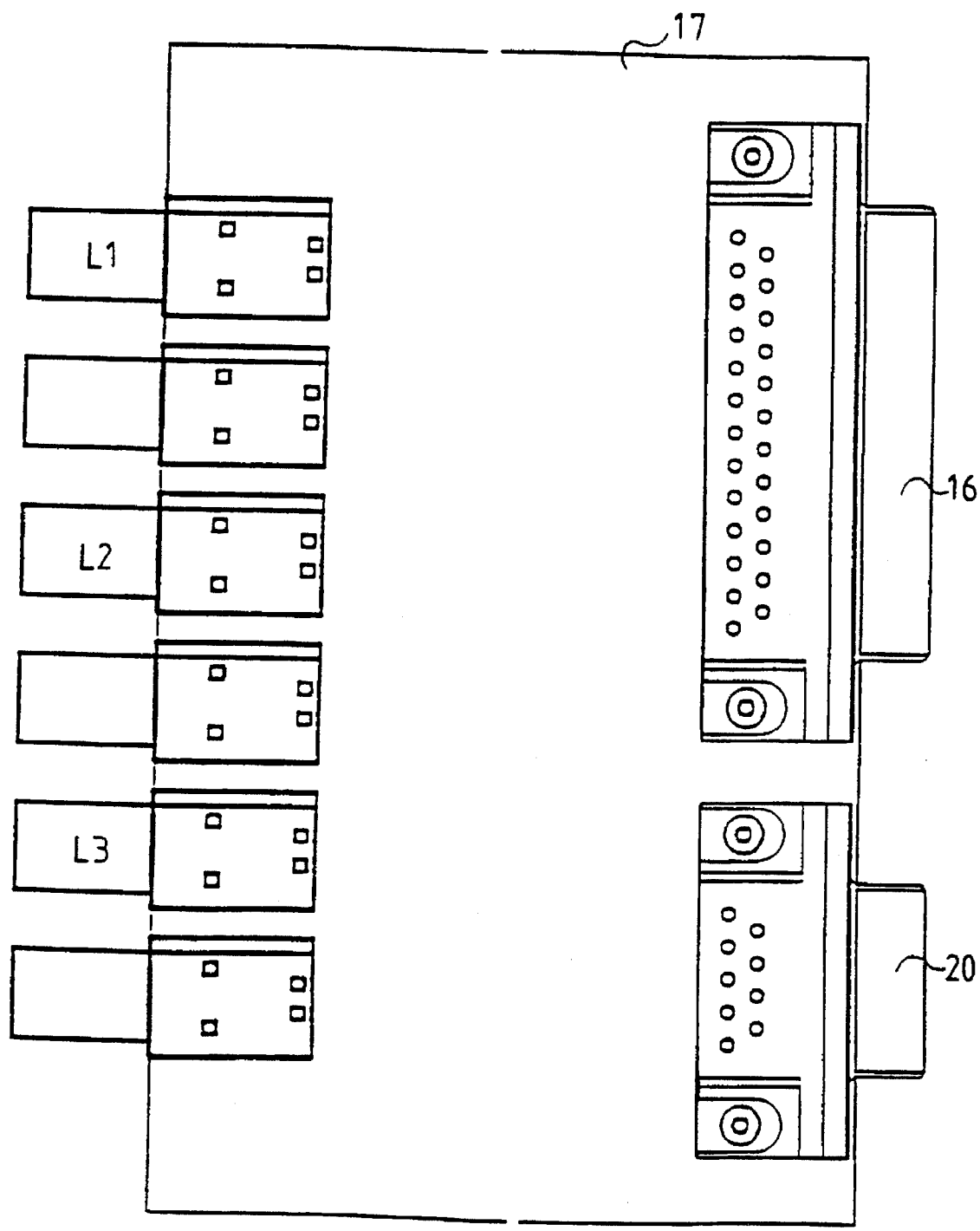
FIG. 5 is an illustration of the printed circuit board to which the sensors are connected.

In the illustrated embodiment, a total of up to eight Hall-effect sensors can preferably be connected by means of shielded signal lines to an electronic detection system. With reference now to FIG. 5, the connection can preferably be made by means of a 25-pin subminiature Cannon connector or plug 16, and this connector/plug 16 can preferably be installed directly on a printed circuit board 17. The printed circuit board 17 is preferably located in a grounded sheet steel housing under the cover of the cabinet or the distribution buses.

Figure 5A:
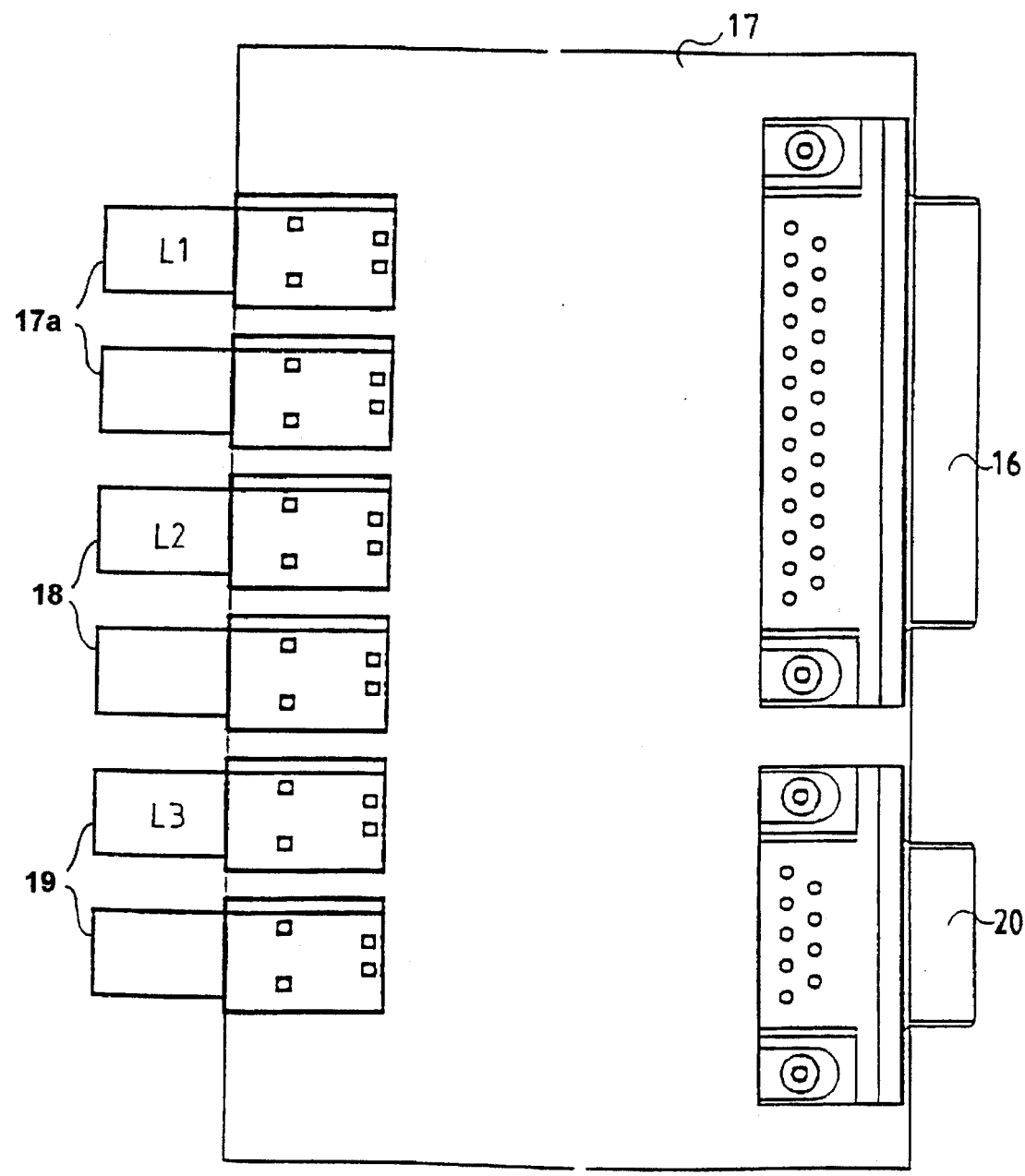
FIG. 5a is essentially the same as FIG. 5, but more detailed.

Up to three optical fiber conductors (LWL) 17a, 18, 19 can be plugged directly into the printed circuit board 17 or can be fixed to it, as shown in FIG. 5a.

In a switchgear bay, in addition to the Hall-effect sensors, one or more optical fiber loops are located in the switchgear bay and are logically "OR" linked to one another.

Thus, in accordance with at least one preferred embodiment of the present invention, a printed circuit board 17 may be provided as part of an electronic detection system. The connection of the Hall-effect sensors to the electronic detection system may be made by a plug 16 as illustrated in FIG. 5 and described hereabove. Further, up to three optical fiber conductors 17a, 18 and 19, as shown in FIG. 5a, may preferably be plugged into, or fixedly attached to, the printed circuit board 17.

The Hall-effect sensors are preferably parallel "OR" interlinked for each location in groups of two to three Hall-effect sensors, and this is preferably accomplished by the electronic detection system in such a manner that the Hall-effect sensors can be located, for example, in the space between two conductors or bus bars, or between the bus bars and the grounded parts of the equipment.

In different functional compartments of a switchgear bay, such as the distribution bus compartment, the equipment compartment or terminal compartment, there can then preferably be up to eight potential sites. For example, one or two groups of Hall-effect sensors can be located in up to three distribution bus compartments. One or two groups of Hall-effect sensors can then be located in up to two equipment compartments. One group of Hall-effect sensors can be in a terminal compartment.

In the electronic detection system or in another signal processing system, the cumulative signal from the optical fibers is preferably logically "AND" linked with the signals from each of the Hall-effect sensors, so that the different switchgear and protective devices, such as the high-speed grounding switch, power circuit breakers, incoming supply circuit breakers and bus coupler breakers, can be addressed.

In the simplest case, there can be one cumulative signal from an "OR" logic operation of the optical fiber sensors with one cumulative signal from an "OR" logic operation of the Hall-effect sensors.

The optical transmitter, receiver and amplifier for the optical fibers are preferably integrated into the electronic detection system.

The logic function for the logic operation of the sensors and the output signals for the protective equipment and switchgear are preferably realized, for example, with GALs, PALs or EPROMS, and can be modified by reprogramming.

The output signals for the protective equipment and switchgear are preferably provided by galvanically separated semiconductor relays and are preferably applied to a 9-pin subminiature Cannon connector 20 (FIGS. 5/5a).

The electronic detection system, into which the logic operation of the sensor signals is also integrated, preferably controls the corresponding interfaces of the switchgear and protective equipment, i.e. by means of the 9-pin subminiature Cannon connector 20.

Additional information on centralized or decentralized tripping is explained below with reference to several possible solutions.

As shown in FIGS. 3 and 4, there are preferably a total of 8 groups of Hall-effect sensors H1 to H8 in all the different types of functional compartments in the first two cabinets 11 and 12, whereby one group can preferably be formed by two Hall-effect sensors.

The individual functional compartments are preferably separated from one another by partitions, etc. in a manner that will be well-known to those of ordinary skill in the art.

In the distribution bus compartment of the cabinets 11 and 12, two groups of Hall-effect sensors H1 and H2 are preferably located between the horizontal bus bars, and are preferably expressly designated for the detection of an arcing fault in this area.

In the equipment compartment of the first cabinet 11, in the vicinity of the vertical connecting bars, there are preferably a third and a fourth group of Hall-effect sensors H3 and H4, whereby the third group of Hall-effect sensors H3 is preferably located in the vicinity of the vertical connecting bars, and the fourth group H4 is preferably located in the vicinity of the vertical outgoing bus bars, i.e. upstream and downstream of the outgoing circuit breaker AA.

The terminal compartment of the first cabinet 11 is preferably equipped with a fifth group of Hall-effect sensors H5 in the vicinity of the vertical outgoing bars or in the vicinity of the horizontal outgoing bars.

In the equipment compartment of the second cabinet 12, there are also preferably a sixth and a seventh group of Hall-effect sensors H6 and H7 respectively, whereby these groups are preferably located upstream and downstream of the incoming supply circuit breaker EA.

An eighth group of Hall-effect sensors H8 is preferably located in the terminal compartment which is used for the incoming supply.

These groups of Hall-effect sensors H1 to H8, as explained above, are connected to a common electronic detection system which can preferably be located in one of the two cabinets 11 or 12.

There are also preferably three loops of optical fiber sensors L1, L2 and L3 which each extend over several cabinets, as shown in FIG. 4.

The first optical fiber sensor L1 is preferably located in the vicinity of the distribution bar compartment of the cabinets 11 and 12 parallel to the bus bars. The second optical fiber sensor L2 preferably extends over both equipment compartments of the cabinets 11 and 12 at right angles to the outgoing, incoming supply and connecting bars. The third optical fiber sensor L3 runs over the terminal compartments of the cabinets 11 and 12.

Naturally, additional cabinets can be equipped with sensors, and these can preferably be part of an additional electronic detection system.

In the substation, the outgoing circuit breaker AA is preferably a known power circuit breaker and, for example, preferably has a break time of about 15 ms. The incoming supply circuit breaker EA shown in FIG. 3 is also preferably a power circuit breaker, but this device preferably has a break time of about 30 ms.

High-speed grounding switch KS preferably produces a dead short circuit in not more than 5 ms.

The times for the detection and reaction to an arcing fault are preferably low compared to the break times of the substation equipment, and preferably will not be more than about 5 ms.

The substation is preferably connected to a power system. The grid should preferably have a short circuit capacity which is high enough that, if an arcing fault is deactivated in less than 20 ms, there will be no damage to equipment, and no injuries to people in the vicinity.

Figure 6:
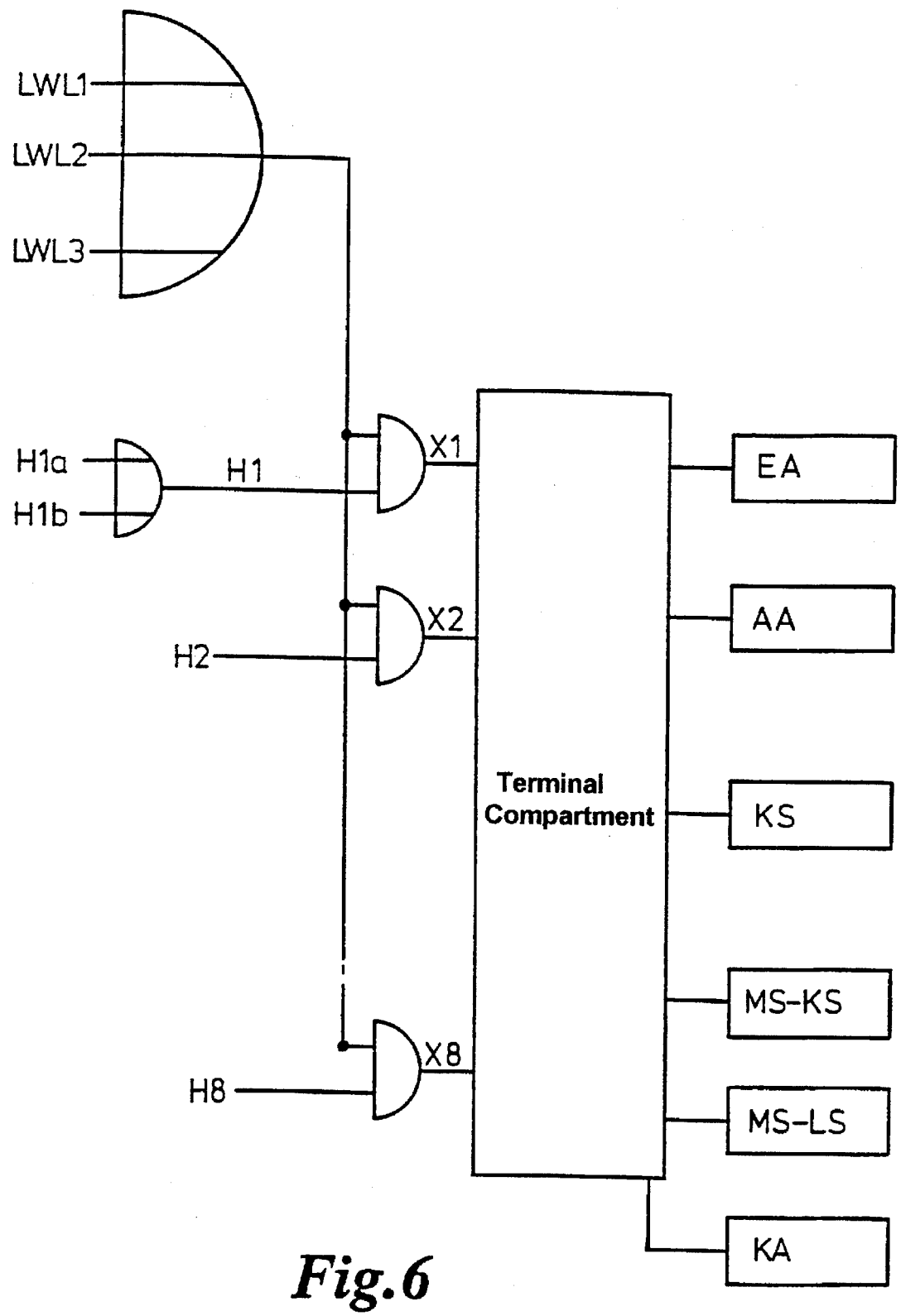
FIG. 6 is an illustration of the logic operation of the sensors, FIG. 6a essentially the same as FIG. 6, but more detailed.
Figure 7:
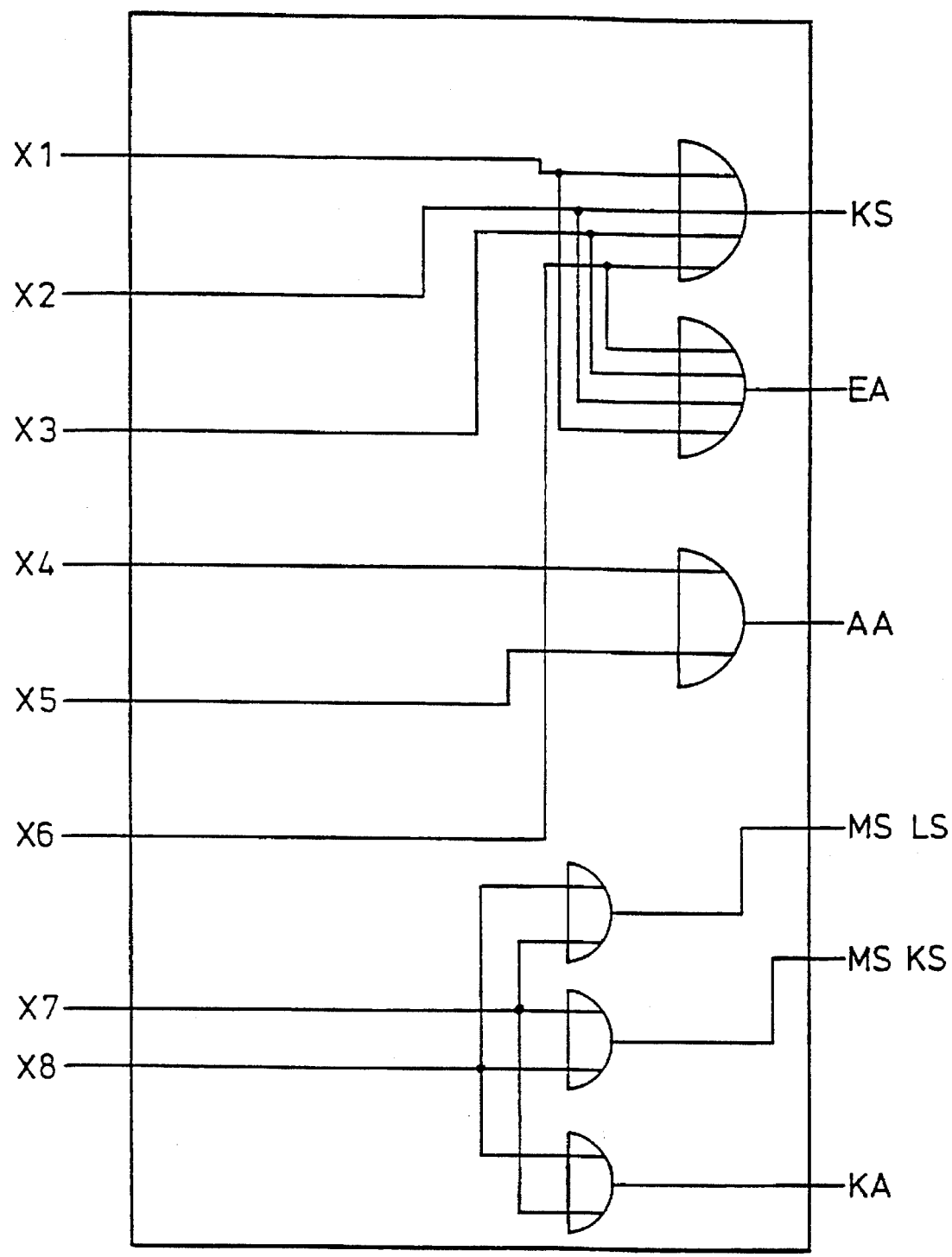
FIG. 7 is an additional illustration of the logic operation.

The sensors, as shown in FIGS. 6 and 7, are preferably logically linked so that different pieces of equipment are tripped, depending on the site of the arcing fault, i.e. the cabinet, the functional compartment and the live parts, such as the line-side connecting bars and outgoing bars.

A cumulative signal is preferably formed from the output signals of the individual optical fiber sensors L1, L2 and L3 by means of an "OR" logic operation, as shown in FIG. 6.

In FIG. 6, the output signals of the individual optical fiber sensors L1, L2 and L3 are indicated, respectively, as LWL1, LWL2 and LWL3.

This cumulative signal is preferably logically "AND" -linked with the output signals of the Hall-effect sensor groups H1 to H8, whereby the Hall-effect sensors H1a, H1b located in pairs, which form a group, are preferably logically "OR" linked.

In accordance with at least one preferred embodiment of the present invention, any or all of the remaining Hall-effect sensor groups H2 to H8 may be similarly arranged as the group H1 mentioned above. Particularly, each group may preferably consist of a pair of sensors "a" and "b" (i.e. H2a/H2b; H3a/H3b; etc.), and these "a" and "b" sensors may preferably be logically "OR" linked.

Figure 6A:
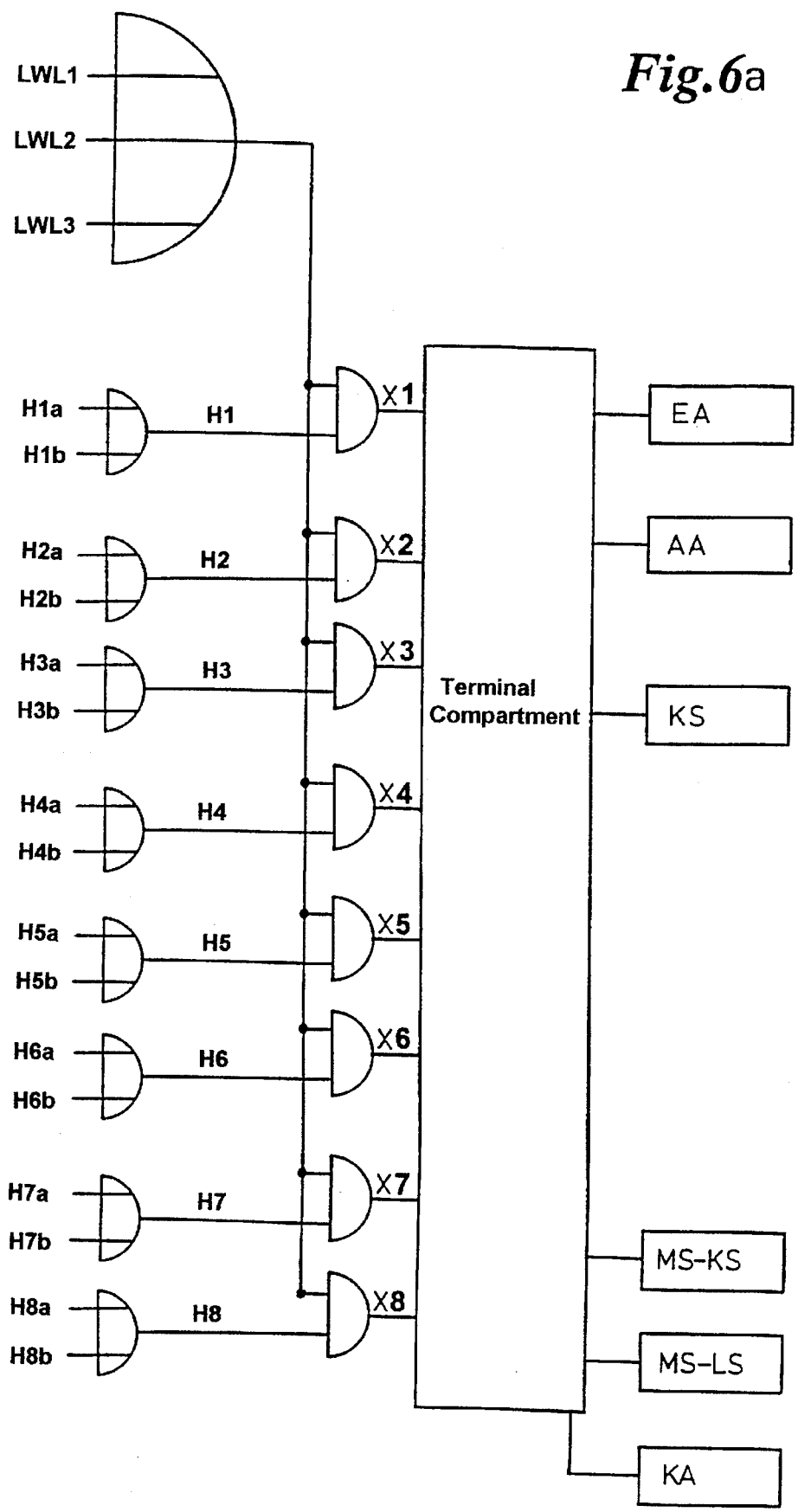

FIG. 6a is a more complete rendition of FIG. 6 wherein each of the Hall-effect sensor groups H2. H8 are additionally depicted, and are each expressed in terms of "a" and "b" sensors. It is to be understood that the rendition shown in FIG. 6a is only provided as an example and is not intended to be restrictive.

The cumulative signals X1 to X8 of the logic operation from the optical fiber and Hall-effect sensors, as shown in FIG. 7, are preferably combined as follows with the various switchgear and protective equipment.

The control signal of the high-speed grounding switch KS located in the low-voltage substation is preferably formed by an OR logic operation of the signals X1 to X3 and X6.

The control signal of the incoming supply circuit breakers EA located in the low voltage substation is likewise preferably formed by an OR logic operation of the signals X1 to X3 and X6.

The control signal of the outgoing circuit breaker EA located in the low voltage substation is preferably formed by an OR logic operation of the signals X4 and X5.

The control signal of the bus coupler breaker KA, located in the low voltage substation, is preferably formed by an OR logic operation of the signals X7 and X8.

The control signal of the medium voltage circuit breaker MS-LS located outside the low voltage substation is also preferably formed by an OR logic operation of the signals X7 and X8.

The control signal of the medium voltage high-speed grounding switch MS-KS located outside the low voltage substation is preferably formed by an OR logic operation of the signals X7 and X8.

The following is a more detailed explanation of the operation of the substation in the event of the occurrence of three types of faults.

The first case represents an arcing fault LBSS in the vicinity of the bus bar, as illustrated in FIG. 1, e.g. in the current bus bar compartment between two bus bars in one of the two cabinets 11 or 12 (response of the Hall-effect sensors H1 or H2 and optical fiber sensor L1), in the equipment compartment between the line-side connecting bars of the outgoing circuit breaker AA (response of the Hall-effect sensors H3 and LWL sensor L2, or in the equipment compartment between the connecting bars of the incoming supply circuit breaker EA connected to the bus bars (response by the Hall-effect sensors H6 and the optical fiber sensor L2).

In this case, a cumulative signal is preferably generated by one of the optical fiber sensors L1 or L2, which is AND linked with a Hall-effect sensor signal from one of the Hall-effect sensors H1, H2 H3, H6, whereby the high-speed grounding switch KS is then preferably actuated and the incoming supply circuit breaker EA is deactivated. The arcing fault is extinguished in less than 5 ms, whereby the short circuit current is interrupted by the incoming supply circuit breaker EA in 30 ms.

In the second case, an arcing fault LBA occurs in the outgoing area of the outgoing circuit breaker AA, whereby the arcing fault occurs either in the equipment compartment of the outgoing circuit breaker AA (response of the Hall-effect sensor H4 and or the optical fiber sensor L2) or in the terminal compartment of the first cabinet 11 (response of the Hall-effect sensor H5 and the optical fiber sensor L3). In this case, a cutoff pulse is transmitted to the outgoing circuit breaker AA, which extinguishes the arcing fault in 15 ms, i.e. in less than the required 20 ms.

In the next example, an arcing fault LBE occurs in the line-side area of the incoming supply circuit breaker, e.g. in the terminal compartment of the second cabinet 12 (response by the Hall-effect sensor H8 and the optical fiber sensor L3) or in the equipment compartment of the incoming supply circuit breaker EA (response by the Hall-effect sensor H7 and the optical fiber sensor L2).

In this case, an upstream switchgear and an additional high-speed grounding switch are actuated, e.g. a medium voltage circuit breaker MS-LS and a downstream high-speed grounding switch MS-KS on the medium voltage side, which are illustrated in FIG. 4.

The high-speed grounding switch MS-KS extinguishes the arcing fault after only 5 ms. The dead short circuit produced by this high-speed grounding switch is then deactivated by the medium voltage circuit breaker MS-LS.

The bus coupler breaker KS is then also activated by the electronic detection system, so that the consumers connected to the bus bar segments SSA can be supplied by the reserve incoming supply R, so that manufacturing processes in the chemical industry, for example, do not need to be interrupted.

In the first case (LBS), alternatively only one control signal can be sent to the high-speed grounding switch KS. The respective branches of the supply are then selectively deactivated by the standard integrated short circuit protection system.

In the second case (LBSS), alternatively one control signal can be transmitted to the high-speed grounding switch KS and to the incoming supply circuit breaker EA, and possibly also to the outgoing circuit breaker AA.

In the third case (LBE), alternatively only one control signal can be transmitted to the medium voltage circuit breaker MS-LS, or additionally or exclusively to the high-speed grounding switch KS.

In complex low voltage substations, a number of sensors and therefore several detection units may be necessary. The transmission of information to trigger the switching processes can be done in a centralized manner or a decentralized manner, as will be explained below with reference to FIGS. 8 and 9.

Figure 8:
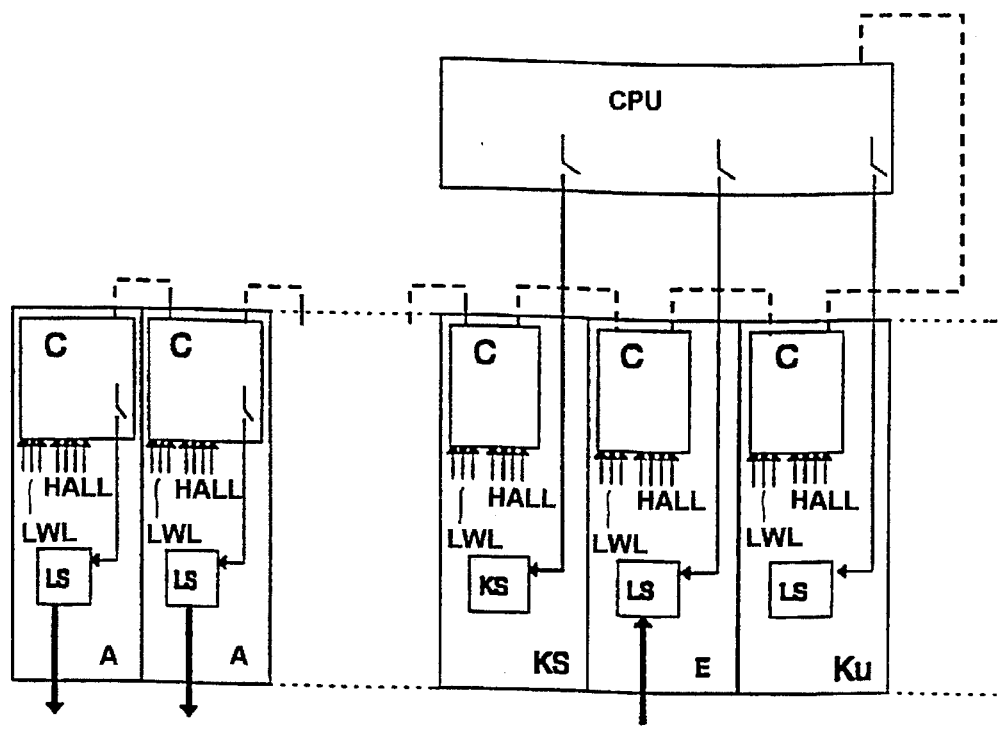
FIG. 8 is an illustration of a central processing unit.

FIG. 8 shows a detail of a low voltage substation which includes switchgear cells, microcontrollers C, optical fiber sensors and Hall-effect sensors connected to the Hall-effect sensors, switchgear and protective equipment, such as power circuit breakers LS and high-speed grounding switches KS which are connected directly to the microcontrollers or to a central unit by means of control lines, whereby the individual microcontrollers and the central unit are preferably connected by an optical data transmission line, which is shown as a dashed line in the drawing.

In each switchgear cell, any fault which occurs is preferably detected, and a signal is then preferably transmitted to the central processing unit without a decision about the switching actions to be performed. In the central processing unit, a decision is made about the switching actions to be performed, as a function of the current status of the system.

Essentially only the deactivation of the power circuit breakers in the outgoing cells can be performed independently in each cell, since this decision can be reached exclusively on the basis of criteria internal to the cell.

The signal is preferably transmitted via an optical data line, on account of the EMV.

Figure 9:
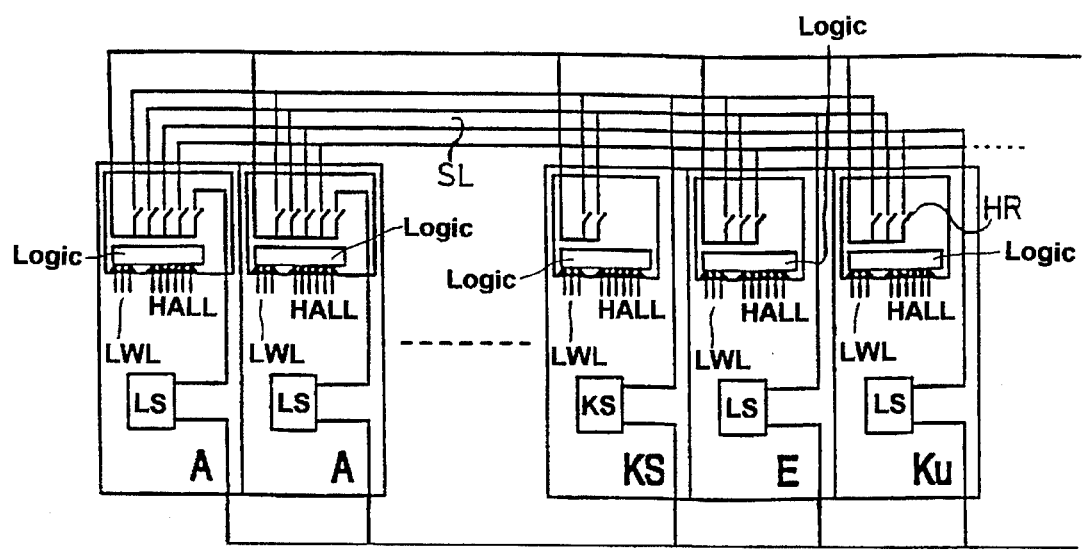
FIG. 9 is an illustration of a decentral processing unit.

FIG. 9 shows a detail of a low voltage substation with decentral tripping of the switchgear.

The individual switchgear cells each preferably have a logic unit with semiconductor relays, and sensors connected to this logic unit. The individual logic units and the substation are preferably connected by means of a control line SL.

In each switchgear cell, a trip signal for the corresponding switchgear is preferably generated directly in response to the detection of the fault, as a function of the location of the fault. This signal is preferably transmitted by a semiconductor relay HR to the control line, and can thus actuate a corresponding tripping element in the switchgear being addressed.

Figure 10:
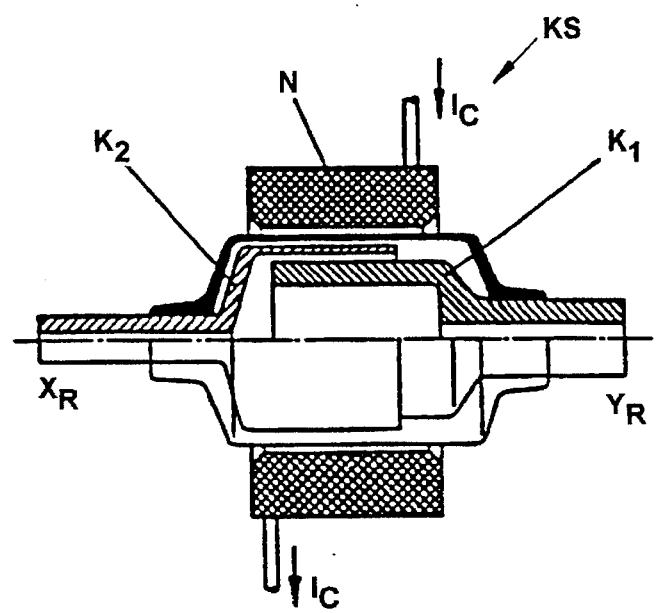
FIG. 10 is a schematic illustration of the high-speed grounding switch.

FIG. 10 shows the high-speed grounding switch KS, which can be realized in a known manner.

In the event of an arcing fault, a high current Ic is preferably briefly activated by an energy storage mechanism into a coil N. As a result of the forces which occur on account of the induction current in cup-like metal parts K1 and K2, a dead short circuit is preferably generated between the short-circuiting parts XR and YR.

The following explanation relates to the Hall-effect sensors H1 to H8, whereby an apostrophe has been added to the reference numbers.

The location and function of these Hall-effect sensors is explained on the basis of the simple examples presented below, without direct reference to the complex examples explained above.

It is to be understood that components discussed herebelow with reference to FIGS. 11–22 may, if appropriate, be considered to be interchangeable with similar components discussed hereabove with reference to FIGS. 1–10.

Figure 11:
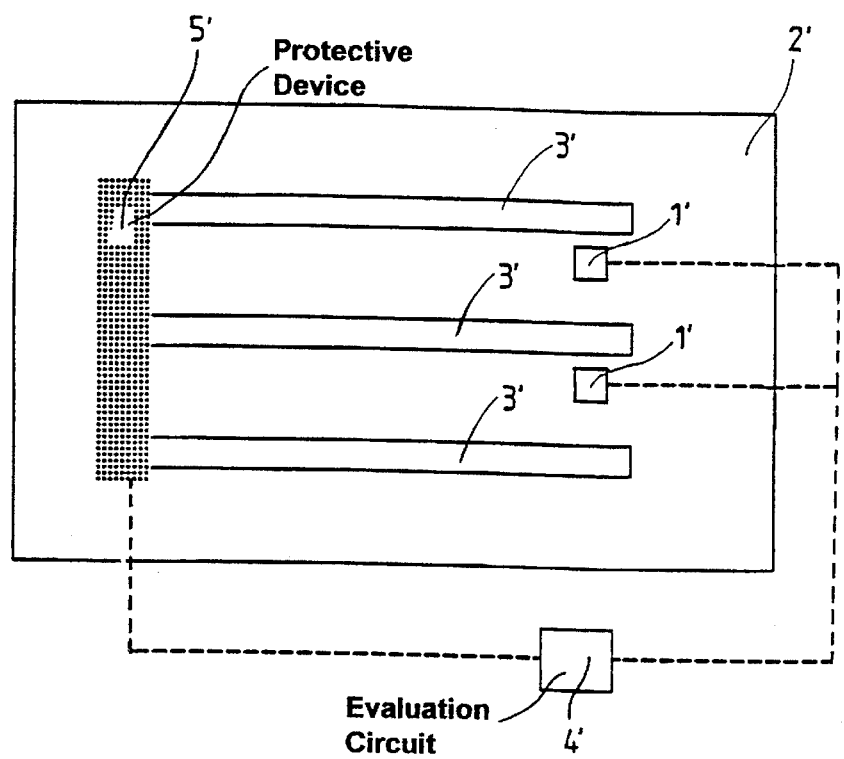
FIG. 11 is a schematic illustration of the device on a system of bus bars in a low voltage substation.

As indicated in FIG. 11, two Hall-effect sensors 1' are preferably located in the bus bar compartment 2' of a low voltage substation, between the bus bars 3'.

The signal generated by the Hall-effect sensors 1' is preferably transmitted to an evaluation circuit 4' (not shown in any further detail here), which processes the signal and, in the event of an arcing fault or another quadrature fault perpendicular to the bus bars 3', preferably actuates a selective switchgear or protective device 5', which rapidly opens the contacts and reduces the effective duration of the arcing fault.

Instead of switchgear, it is also possible to use a device which generates a defined short circuit which is harmless to the system. Such devices will be well-known to those of ordinary skill in the art and, as such, will not be described in any further detail herein.

The Hall-effect sensors 1' are preferably omnipolar, digital Hall-effect sensors 1', which change their control state when a magnetic field parallel to the surface of the sensor enters the effective range of the sensors. The Hall-effect sensors 1' then preferably change their control state, regardless of the direction of the magnetic field acting on them (north-south or south-north direction). If the Hall-effect sensors close, e.g. in the presence of a magnetic field in the north-south direction, when the making or switching magnetic flux density drops below a specified value, e.g. by means of a magnetic field in the south-north direction, the Hall-effect sensors 1' are preferably reset to their initial status. The result is a square wave curve of the Hall-effect signal.

Figure 12:
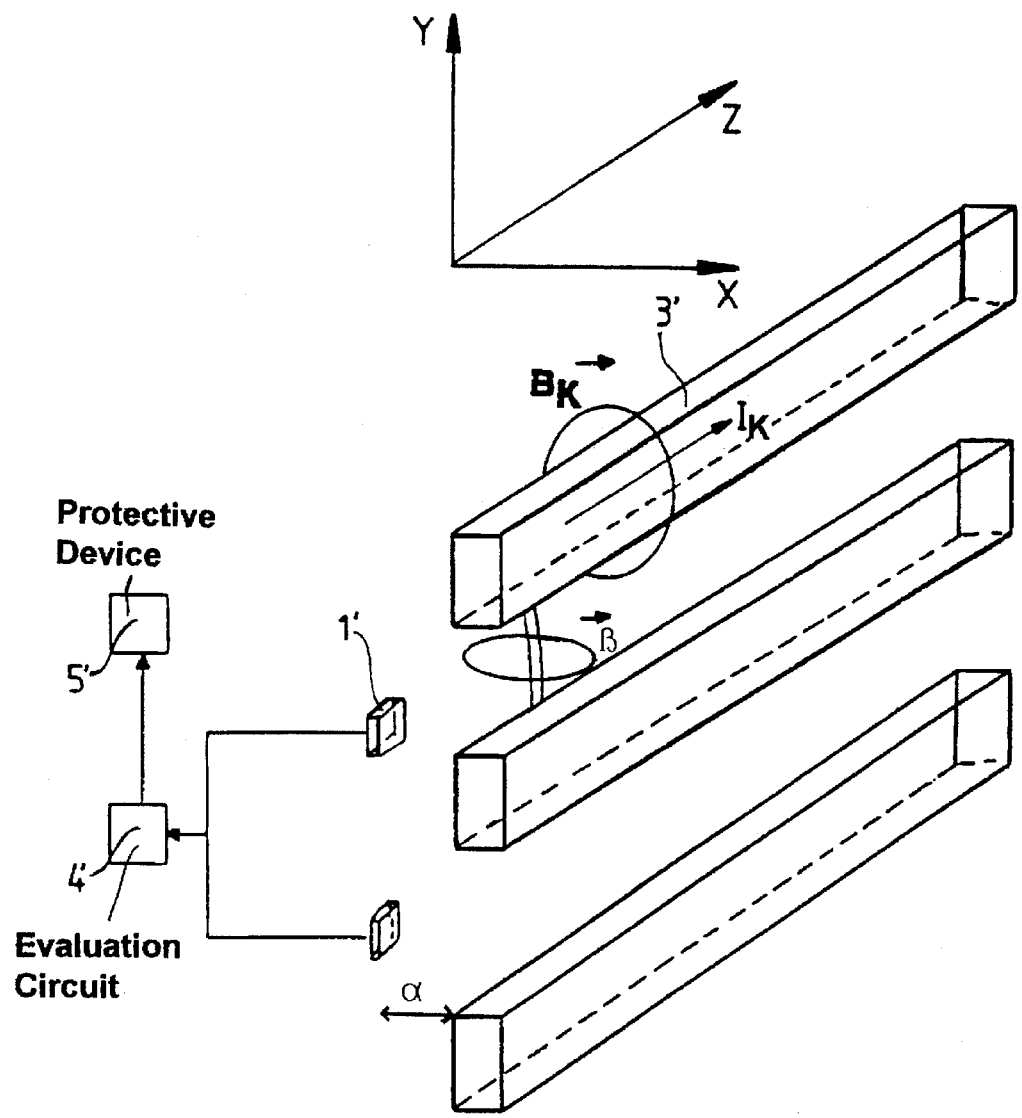
FIG. 12 is a view in perspective of the device on a system of bus bars in a low voltage substation.
Figure 16:
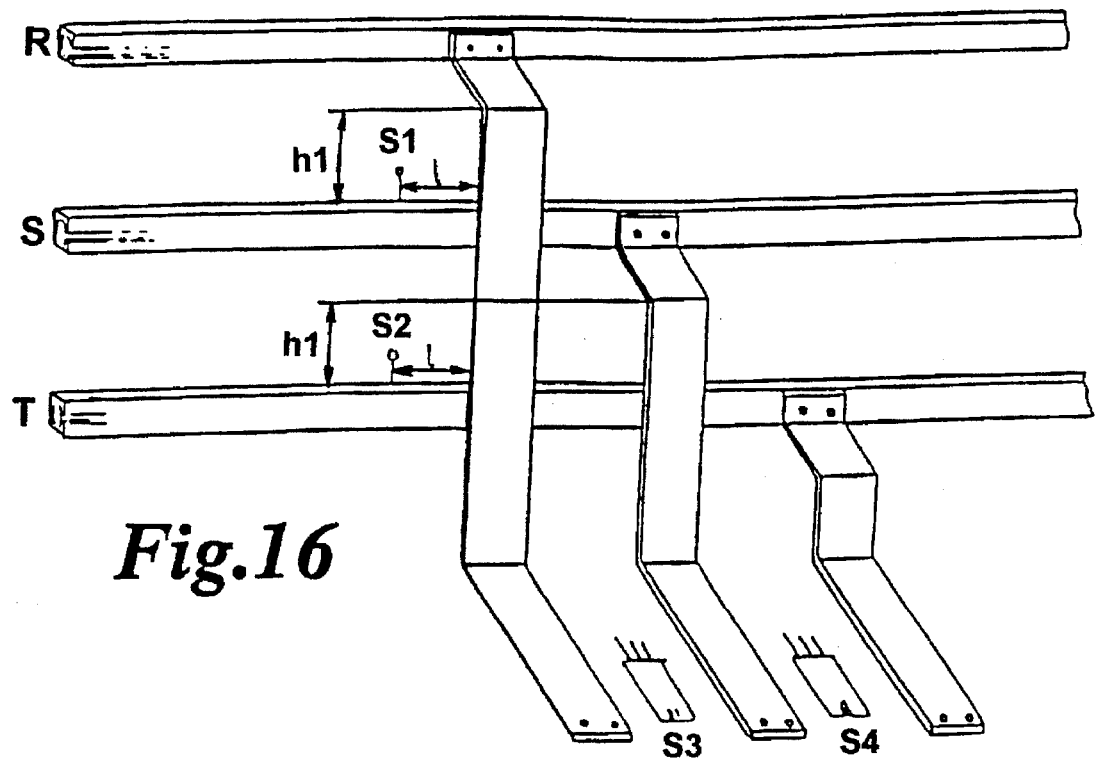
FIG. 16 is an illustration of a system of bus bars with outgoing bus bars and additional Hall-effect sensors.

As shown in FIG. 12, the Hall-effect sensors 1 are preferably oriented with their surface parallel to the bus bars 3', and at a distance d of several centimeters, preferably three centimeters, from them. It should be understood that, in accordance with at least one preferred embodiment of the present invention, this distance "d" can be considered to essentially represent an offset distance as measured in a direction perpendicular to the longitudinal direction of the bus bars.

In this case, the Hall-effect sensors 1' are preferably oriented so that they only change their control state when a magnetic field runs parallel to the Y-Z plane of the coordinate system illustrated in FIG. 12.

The figure shows an arcing fault between the top two bus bars 3'. The magnetic field B caused by the fault current runs essentially parallel to the X-Z plane, and consequently the Hall-effect sensor 1' generates an output signal.

On the other hand, short circuit currents in the bus bars caused by dead short circuits should preferably not be detected by the arc detector. The short circuit current designated Ik in the uppermost bus bar 3' preferably generates a magnetic field which is in the effective range of the Hall-effect sensor and runs in the Y and X direction, but it does not cause an output signal.

FIG. 13 shows the orientation of the Hall-effect sensors S1, S2 for the detection of an arcing fault on the horizontal main bus bars 6', although the operating current of the vertical output bars 7' essentially does not generate a Hall signal, whereby the Hall-effect sensors are indicated only schematically.

Each of the two Hall-effect sensors S1, S2 is preferably installed within the distance h1, i.e. between the bus bars, so that they are simultaneously positioned with their long side inside the distance or width b1 of the outgoing bars 7', whereby the distance b1 (FIG. 15) corresponds to the thickness of the bus bars of the outgoing bars 7', as shown in the detail Z in FIG. 15, and whereby the long side of the Hall-effect sensors S1, S2 also corresponds to the working, or load current, direction.

The distance 1 between the outgoing bars and the Hall-effect sensor S1 or S2 should preferably be as small as possible. This positioning can essentially guarantee that the magnetic field generated by the load current in the vertical bus bar system will in all cases be perpendicular to the Hall-effect sensor S1 or S2, and will therefore not result in the generation of a Hall-effect signal. At the same time, the magnetic field which is generated by the load current through the horizontal bus bar system is also essentially perpendicular to the surface of the sensor.

The tangential component of the magnetic field which acts parallel to the surface of the sensor preferably runs perpendicular to the working, or load current, direction of the sensor, and therefore cannot essentially initiate the generation of any Hall-effect signal, either.

When the sensors are positioned as shown in FIGS. 13 and 15, a flow of operating current in the horizontal and vertical bus bar system does not typically cause the sensors to generate a Hall-effect signal. Only in the event of an arcing fault is a Hall-effect signal generated. In this case, the tangential component of the magnetic field produced by the arcing fault in the horizontal bus bar system runs parallel to the working direction of the sensor and exceeds its closing flux density.

Figure 17:
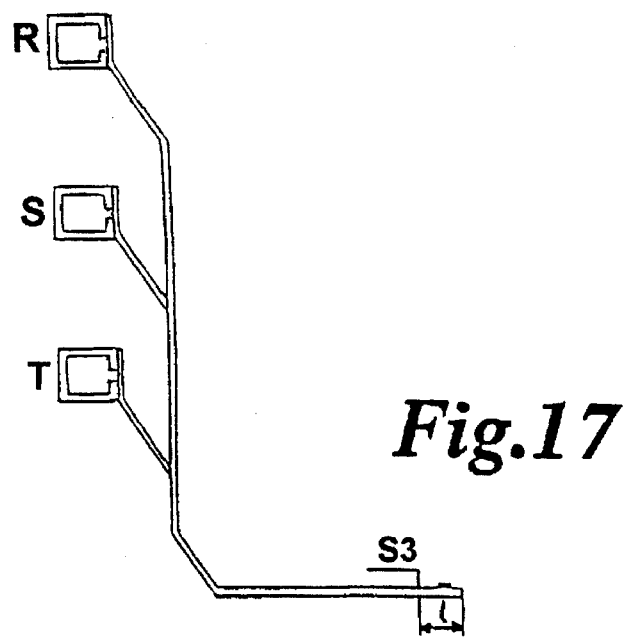
FIG. 17 is an illustration of the system of bus bars illustrated in FIG. 16, from the side.

The arrangement illustrated in FIG. 13 can essentially only detect an arcing fault in the horizontal bar system. In that case, it is advantageous to also install a sensor system in the vertical area. In this case, Hall-effect sensors S3 and S4 are preferably oriented like the Hall-effect sensors S1, S2 between the outgoing bars 7', as illustrated in FIG. 17.

The optical fiber sensors L1 to L8 are explained in greater detail below; in the following explanation, two apostrophes have been added to the reference numbers.

The arrangement and function is explained by means of the following simple examples, essentially without direct reference to the complex examples explained above.

The device illustrated in FIGS. 18 to 22 is designed to detect an arcing fault in the bus bar compartment of a low voltage substation which is threatened by arcing faults.

The device 1" preferably includes an optical fiber conductor 2", an electronic circuit 3" with a light-emitting diode which emits a constant light beam of a defined wavelength at the beginning of the optical fiber conductor 1" and a receiver on the end of the optical fiber conductor 1". This light beam is preferably used to monitor the protective equipment. Some of the problems which can thereby be prevented are the drift of structural components and mechanical damage to the optical fiber conductor. If an arcing fault develops in the bus bar compartment, the light from the arc is injected into, or interferes with, the optical fiber conductor through its jacket. This additional light essentially raises the level of light received by an evaluation circuit. The electronic circuit 3" preferably generates a voltage which is proportional to the level of light.

After a specified make-and-break level, which can be set by means of the evaluation circuit, is exceeded, a signal is preferably generated which can be used by a selective protective device 4" to deactivate the portion of the substation in which the arcing fault is occurring, or another suitable device. The evaluation circuit is preferably located in a place which is not endangered by arcing faults.

The optical fiber conductor 2" preferably includes a gradient fiber with a core of approximately 0.06 mm, a jacket of approximately 0.12 mm and a second jacket or primary protection consisting of a colored acrylate with a diameter of approximately 0.25 mm with a green or blue color. Consequently, the optical fiber conductor 2" has favorable characteristics, both from the point of view of the injection of light from arcing faults and from the point of view of its insensitivity to interference from light from external sources. It also has good characteristics in terms of mechanical strength and the required bending radii. The optical damping of the optical fiber conductor is 3 to 4 Db/km at 850 nm and 0.5 to 1.5 Db/km at 1300 nm.

At relatively high currents, optical fiber conductors with a blue jacket essentially have a reliable detection capability and a low probability of faulty tripping, while optical fiber conductors with a green jacket meet the requirements for rapid and reliable detection even at lower currents, e.g. Ik=4 kA. The optical fiber conductors with a green jacket are therefore preferably used in the range of low currents, while the optical fiber conductors with a blue jacket are most appropriately used with higher currents.

In low voltage switchgear which are used as main distribution switchgear, on account of the greater short circuit capacity available and the related large fault currents, preference is given to the use of the optical fiber conductor with the blue jacket. An additional aspect is that in main distribution substations, it is highly desirable that the protection technology be very reliable, because a faulty trip can have serious consequences on the equipment connected to the system. Therefore the more reliable optical fiber conductor with the blue jacket is preferred in this case, because there is a lower probability of faulty tripping, and in any case there is sufficient radiant power.

On account of the use of commercially available optical fiber conductors with a colored jacket, which colored jacket has previously only been used to distinguish one optical fiber conductor from another in signal transmission applications, additional filters are unnecessary.

Reliable operation of the detection circuit is highly desirable in order to guarantee a high degree of safety of the system. It should generally be guaranteed that even at extremely small arc powers, the detection device responds reliably, and nevertheless, a sufficient difference between background noise and useful signal level is maintained. A faulty trip in the event of an insufficient difference between the background noise and the useful signal level can result in the cutoff of power to major consumers, and failure to respond in the event of too great a difference between background noise and the useful signal level can result in the destruction of the system.

To achieve sufficient protection against light interference, the maximum background level in this embodiment is preferably a minimum of 30 per cent and a maximum of 50 per cent of the useful signal level. A further increase of the signal-to-noise ratio of course increases the protection against light interference, but it simultaneously makes it more difficult to detect arcing faults, because the response threshold may no longer be reached. The detection times also become longer, so that the detection no longer takes place in the space of a few milliseconds.

The optical fiber conductor is preferably located at a distance of approximately 50 mm from the bus bars. The optical fiber conductor is preferably approximately the same distance above and below the bus bar system. The distance between them can be reduced, but the optical fiber conductor should preferably not be located directly on the bus bars, because that is where the shadowing effect of the bus bars is the greatest.

It is also advantageous to locate the optical fiber conductors at a distance which corresponds to the distance between the bus bare.

Figure 18:
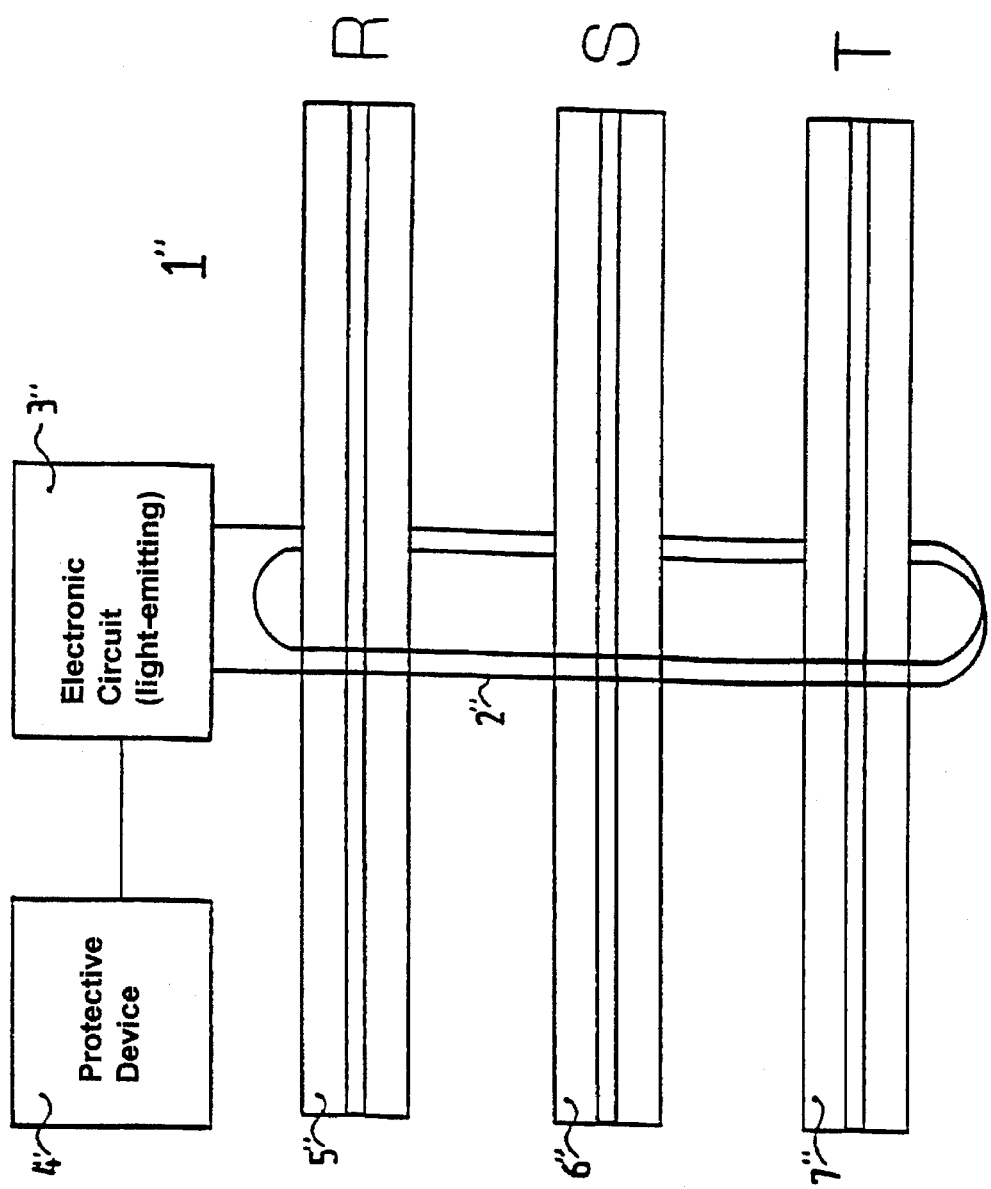
FIG. 18 is a first example of the arrangement of the optical fiber conductor on three bus bars.
Figure 18:
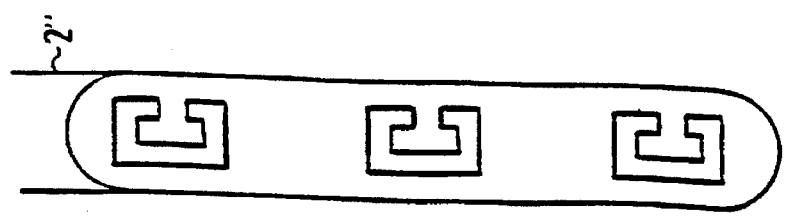

FIG. 18 shows an arrangement with three bus bars 5", 6" and 7", and one optical fiber conductor 2", which is oriented perpendicular to the bus bars, and is wound around all three bus bars 5", 6" and 7", without touching them. If an arcing fault occurs between two bus bars, the arc can be considered a linear radiation source. The optical conductor 2" then essentially lies parallel to the arcing fault. The radiation is emitted radially symmetrically and encounters the optical fiber conductor at points where the latter is straight or slightly curved. The light which is thereby given off is injected by microscopic curves of the axis of the optical fiber conductor. The radiation which occurs on the jacket surface of the optical fiber conductor in the radiation maximum, on account of its location, is high compared to the outside light, so that the arcing can be detected even during the early phases of the arcing fault, i.e. in the range of less than 5 ms. This reaction can also be enhanced by the filtering effect of the jacket.

The radii of the bends of the optical fiber conductor, here and in the examples explained below, are preferably relatively large in the vicinity of the light injection, e.g. greater than 40 mm, so that only a small amount of interference is caused by light from outside sources.

Figure 19:
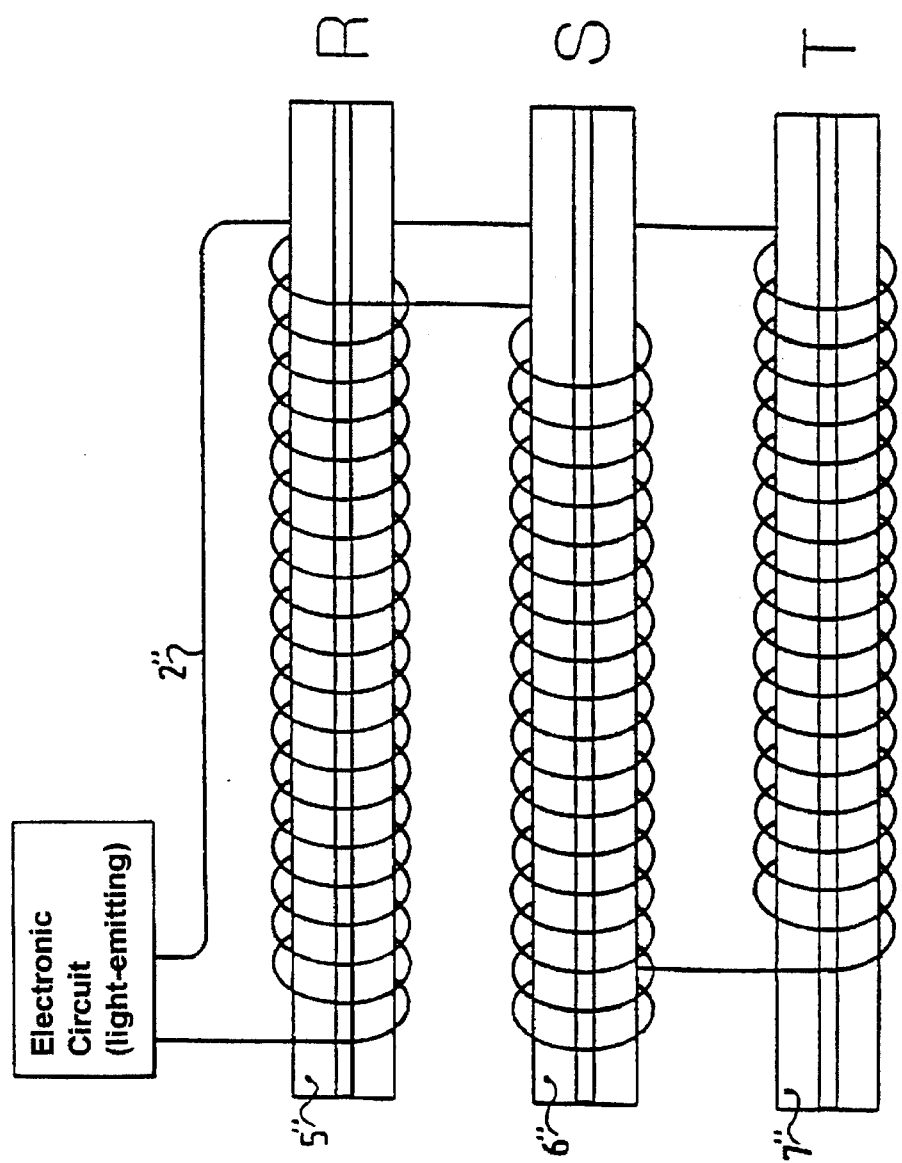
FIG. 19 is a second example of the arrangement of the optical fiber conductor on three bus bars.
Figure 19:
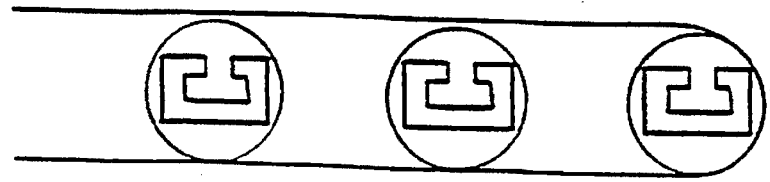

As shown in FIG. 19, the optical fiber conductor 2" can also be wound around each bus bar (5",6",7") several times, either over the entire length of the bus bar or over major portions of it. An arcing fault will then always be very close to the optical fiber conductor, so that sufficient light will be injected even in the early stages of arcing, and a particularly rapid detection is possible. Of course, in this case there is the increased danger that the optical fiber conductor may be destroyed, but the destruction will occur after the fault has been detected.

Figure 20:
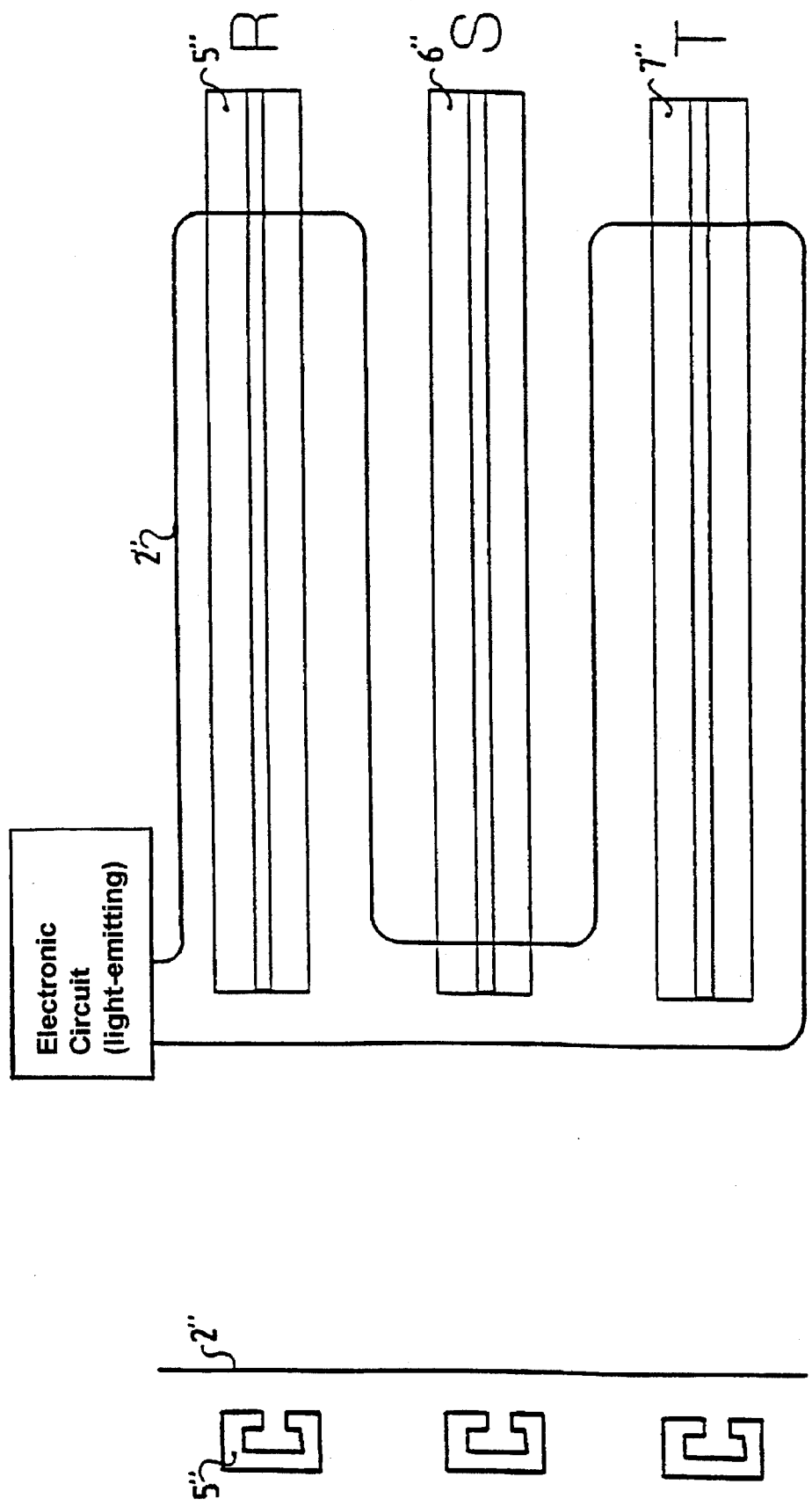
FIG. 20 is a third example of the arrangement of the optical fiber conductor on three bus bars.

Another arrangement of the optical fiber conductor is illustrated in FIG. 20. In FIG. 20, the optical fiber conductor is arranged in a meandering fashion in front of the bus bars. It is also possible to locate the optical fiber conductor behind the bus bars. The optical fiber conductor 2" runs over broad areas parallel to the bus bars and at an approximately uniform distance, so that even with relatively short optical fiber conductors, it is possible to reliably cover a wide detection area.

Figure 21:
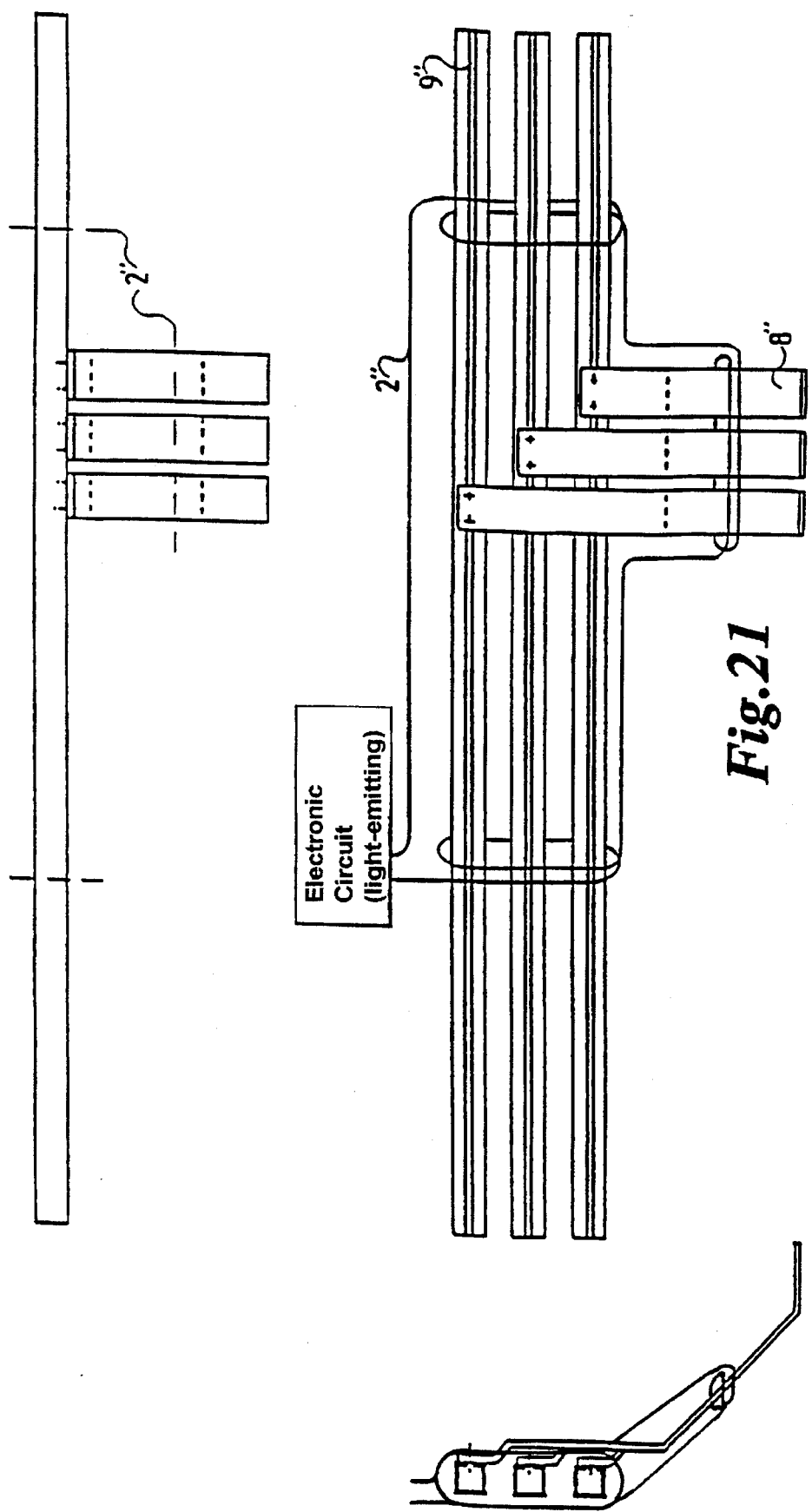
FIG. 21 is an example of the arrangement of the optical fiber on three bus bars, with conductor bars connected to them vertically, and, FIG. 22 is another example of the arrangement of the optical fiber on three bus bars and conductor bars connected to them vertically.

If there are connecting bars, as shown in FIG. 21, of field bus bars, then the same optical fiber conductor can also be wound around these perpendicular bars.

Figure 22:
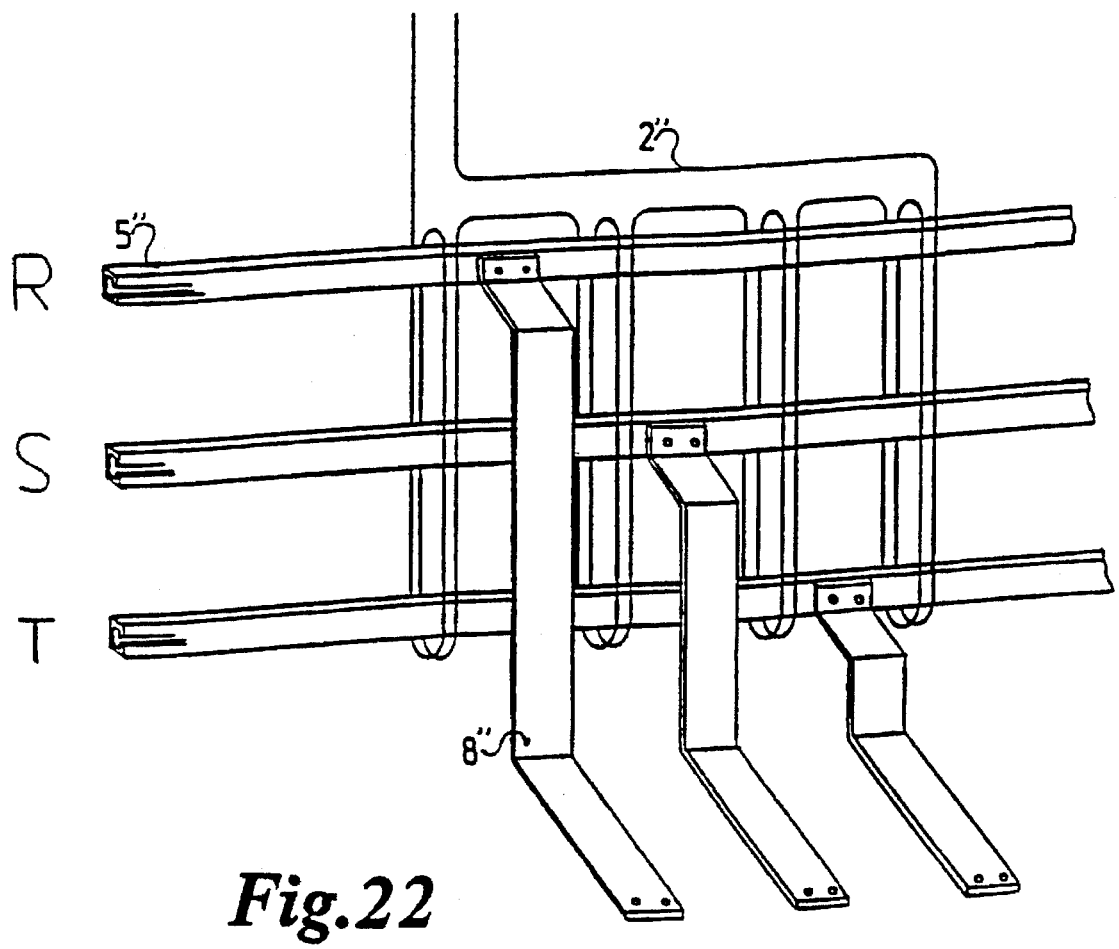

FIG. 22 shows a layout in which the optical fiber conductor 2" can also be wound between current taps. This is the area where arcing faults will most probably occur.

Additional criteria of the field of the invention, such as the rate of current rise or a voltage dip, can also be used to prevent faulty trips.

In a substation, in particular in a low voltage substation, each functional compartment such as the bus bar compartment, the equipment compartment and the terminal compartment, can be provided with a separate optical fiber conductor.

The optical fiber conductor can be located on bulkheads and on other parts of the equipment located near the bus bars, whereby the optical fiber conductors can be fastened by means of adhesive or by means of fasteners, such as fastening lugs or spacers. In the main distribution bus bar systems, the bus bar mountings can be used for the fastening, e.g. fasteners like those described and illustrated in German Patent No. 40 13 312 can be used. The optical fibers can then be guided through holes provided for the purpose.

In main distribution bus bar systems, it is particularly advantageous if the optical fiber conductor is located along the bus bars centrally in the space between the bars. On the other hand, in equipment terminal compartments, it is particularly favorable if the optical fiber conductor is oriented at right angles to the bus bars, as a loop or in a meandering shape, e.g. on a bulkhead. On outgoing bars which are longer than 300 mm, it is advantageous to lay the optical fiber conductor lengthwise.

The optical fiber conductor is preferably advantageously located in the immediate vicinity of, or around, live parts, whereby direct contact with the live parts, or an installation in direct contact with them, is not excluded, i.e. it is included in the concept "in the immediate vicinity".

In these examples, the Hall-effect sensors are preferably sensors which react to magnetic fields, and in contrast to magnetically sensitive sensors, such as current and voltage transformers, they preferably react independently of the current and voltage.

The switchgear housings made of sheet metal or metal can essentially be considered to represent a barrier for external magnetic fields, which might otherwise be injected into the Hall-effect sensors.

It is particularly advantageous if each Hall-effect sensor is protected by epoxy resin.

As a matter of recapitulation, it should be understood that, in accordance with at least one preferred embodiment of the present invention essentially any suitable plug connections, including well-known 25-pin and 9-pin plug connections, can be used in conjunction with connections 16 and 20 (see FIG. 5). Since such 25-pin and 9-pin connection arrangements are generally very well-known to those of ordinary skill in the art, they will not be discussed in any further detail herein.

It should be understood that the "blue" and "green" jackets discussed heretofore, in conjunction with the optical current sensors, can, in accordance with at least one preferred embodiment of the present invention, be embodied by essentially any suitable jackets of essentially any suitable tint or shade of blue or green, or conceivably of another color, that will produce the results discussed heretofore in conjunction with the "blue" and "green" jackets.

Finally, it is to be understood that, in accordance with at least one preferred embodiment of the present invention, the term "omnipolar", as set forth heretofore, may be considered to be interchangeable with "multipolar".

One feature of the invention resides broadly in the substation for the distribution of electrical energy, and protected against arcing faults, characterized by the fact that Hall-effect sensors H1 to H8 and additional optical fiber conductors L1 to L3 are provided as sensors, whereby the Hall-effect sensors H1 to H8 are logically AND linked with the optical fiber conductors L1 to L3.

Another feature of the invention resides broadly in the substation characterized by the fact that a high-speed grounding switch KS is actuated, whereby, in the event of an arcing fault, a high current Ic is briefly actuated by an energy storage mechanism into a coil N which in turn, on account of the forces which are generated by the induction current in cup-like metal parts K1 and K2 in a vacuum, generates a dead short circuit between the parts XR and YR to be short circuited.

Yet another feature of the invention resides broadly in the substation characterized by the fact that a high-speed grounding switch KS is actuated when the power circuit breaker located upstream of the point of origin of the arc has a longer break time than the allowable arcing time.

Still another feature of the invention resides broadly in the substation characterized by the fact that the Hall-effect sensors H1 to H8 are omnipolar, digital Hall-effect sensors which change their control state when a magnetic field parallel to the surface of the sensor comes within the effective range of the sensors.

A further feature of the invention resides broadly in the substation characterized by the fact that the optical fiber conductor sensors L1 to L3 have a blue jacket, whereby the light from the arcing faults is injected through this jacket.

Another feature of the invention resides broadly in the substation characterized by the fact that the Hall-effect sensors H1 to H8 are locally sensors H1 to H8 which detect arcing faults, and are located in the individual switchgear cells 11 to 13, functional compartments, such as the distribution bar compartment, equipment compartment or terminal compartment, and segments of the functional compartments such as incoming supply or outgoing bars of switchgear, that these Hall-effect sensors H1 to H8 are connected to a common evaluation and control unit which corresponds to at least one group of sensors, where they are logically combined, and that the evaluation and control unit controls the switching actions of the switchgear and protective equipment EA, AA, KS, KA located in the equipment compartments.

Several U.S. patents, as well as other publications, disclose known components which may be utilized in accordance with the embodiments of the present invention. Further, several of these patents and publications discuss general concepts relating to substations, distribution arrangements and circuit breakers, which form at least a part of the environment of the present invention. These patents and publications are listed herebelow and elsewhere in the instant specification.

Accordingly, U.S. Pat. No. 5,101,080, which issued to Ferenc (sic) on Mar. 31, 1992, discloses busbar arrangements for current distributor arrangements, as well as other known components and arrangements that can be utilized in the context of the embodiments of the present invention.

U.S. Pat. No. 5,176,529, which issued to Heinz et al. on Jan. 5, 1993, discloses a device for connecting control current lines in low voltage switchboard arrangements, as well as other known components and arrangements that can be utilized in the context of the embodiments of the present invention.

U.S. Pat. No. 5,222,910, which issued to Boros et al. on Jun. 29, 1993, discloses electrical connection apparatus for use in conjunction with busbar arrangements and electrical distribution arrangements, as well as other known components and arrangements that can be utilized in the context of the embodiments of the present invention.

U.S. Pat. No. 5,322,444, which issued to Audehm et al. on Jun. 21, 1994, discloses an arrangement for the electrical connection of busbars in a low-voltage energy distribution system, as well as other known components and arrangements that can be utilized in the context of the embodiments of the present invention.

U.S. Pat. No. 5,362,933, which issued to Kutsche et al. on Nov. 8, 1994, discloses electrical switching devices, in particular low voltage power circuit breakers, as well as other known components and arrangements that can be utilized in the context of the embodiments of the present invention.

Other U.S. Patents, related in terms of general subject matter to the five U.S. Patents listed immediately above, and which thus also disclose known components and arrangements that can be utilized in the context of the embodiments of the present invention, are as follows: U.S. Pat. No. 2,904,621, which issued to Grier in September 1959; U.S. Pat. No. 3,588,399, which issued to Vlosca in June 1971; U.S Pat. No. 4,810,213, which issued to Chabot in March 1989; U.S. Pat. No. 3,459,872, which issued to Weimer et al. in August 1969; U.S. Pat. No. 3,459,874, which issued to Fouse et al. in August 1969; U.S. Pat. No. 4,627,680, which issued to Weimer in December 1986; U.S. Pat. No. 4,345,354, which issued to Ichikawa in August 1982; U.S. Pat. No. 5,157,577, which issued to Balaud et al. in October 1992; U.S. Pat. No. 5,219,070, which issued to Grunert et al. in June 1993; and U.S. Pat. No. 5,286,935, which issued to Mina et al. in February 1994.

General concepts relating to arcing faults are discussed among the following U.S. Patents: U.S. Pat. No. 5,224,006, which issued to MacKenzie et al. on Jun. 29, 1993; U.S. Pat. No. 5,245,498, which issued to Uchida et al. on Sep. 14, 1993; and U.S. Pat. No. 5,307,230, which issued to MacKenzie on Apr. 26, 1994.

Examples of substations and components associated therewith, which may be utilized in accordance with the embodiments of the present invention, may be found in the following U.S. Patents: U.S. Pat. No. 5,179,376, which issued to Pomatto on Jan. 12, 1993; U.S. Pat. No. 5,188,538, which issued to Joveux-Bouillon et al. on Feb. 23, 1993; U.S. Pat. No. 5,239,441, which issued to Fox et al. on Aug. 24, 1993; U.S. Pat. No. 5,243,293, which issued to Isozaki on Sep. 7, 1993; U.S. Pat No. 5,341,268, which issued to Ishiguro et al. on Aug. 23, 1994.

Examples of Hall-type sensors, which may be utilized in accordance with the embodiments of the present invention, may be found in the following U.S. Patents: U.S. Pat. No. 5,187,988, which issued to Dettmer et al. on Feb. 23, 1993; U.S. Pat. No. 5,191,528, which issued to Yardley et al. on Mar. 2, 1993; U.S Pat. No. 5,196,794, which issued to Murata on Mar. 23, 1993; U.S. Pat. No. 5,218,298, which issued to Vig on Jun. 8, 1993; U.S. Pat. No. 5,233,295, which issued to Murata et al. on Aug. 3, 1993.

Discussion of square waves in conjunction with Hall-type sensors may be found in the following U.S. Patents: U.S. Pat. No. 5,241,263, which issued to Naoi et al. on Aug. 31, 1993; U.S. Pat. No. 5,293,104, which issued to Dreier on Mar. 8, 1994.

Examples of digital-type Hall sensors and multi/omni-polar Hall sensor arrangements, which may be utilized in accordance with the embodiments of the present invention, may be found in the following U.S. Patents: U.S. Pat. No. 5,307,013, which issued to Santos et al. on Apr. 26, 1994; U.S. Pat. No. 5,370,015, which issued to Moscatelli on Dec. 6, 1994; U.S. Pat. No. Re. 31278, which reissued to Schmider on Jun. 14, 1983; U.S. Pat. No. 4,969,753, which issued to Kato et al. on Nov. 13, 1990; U.S. Pat. No. 4,865,468, which issued to Kato et al. on Sep. 12, 1989.

Examples of optical sensor arrangements, including optical fiber sensor arrangements, which may be utilized in accordance with the embodiments of the present invention, may be found in the following U.S. Patents: U.S. Pat. No. 5,243,293, which issued to Isozaki et al. on Sep. 7, 1993; U.S. Pat. No. 5,295,207, which issued to Dupraz et al. on Mar. 15, 1994; U.S. Pat. No. 5,271,073, which issued to Hui et al. on Dec. 14, 1993; and U.S. Pat. No. 5,336,883, which issued to Hobby et al. on Aug. 9, 1994.

Examples of ground switch arrangements, including high-speed ground switch arrangements, which may be utilized in accordance with the embodiments of the present invention, may be found in the following U.S. Patents: U.S. Pat. No. 5,303,114, which issued to Ferry et al. on Apr. 12, 1994; U.S. Pat. No. 5,329,192, which issued to Wu et al. on Jul. 12, 1994; U.S. Pat. No. 5,363,287, which issued to Liu et al. on Nov. 8, 1994; and U.S. Pat. No. 5,309,109, which issued to Miyazaki et al. on May 5, 1994.

Examples of switchgear arrangements, which may be utilized in accordance with the embodiments of the present invention, may be found in the following U.S. Patents: U.S. Pat. No. 5,176,529, which issued to Heinz et al. on Jan. 5, 1993; U.S. Pat. No. 5,193,049, which issued to Jackson on Mar. 9, 1993; U.S. Pat. No. 5,200,585, which issued to Davies et al. on Mar. 6, 1993; and U.S. Pat. No. 5,247,419, which issued to Grundmann on Sep. 21, 1993.

Examples of medium-voltage circuit breakers, which may be utilized in accordance with the embodiments of the present invention, may be found among the U.S. Patents listed heretofore and also in U.S. Pat. No. 5,179,257, which issued to Dufournet et al. on Jan. 12, 1993.

Examples of GAL, PAL and EPROM arrangements, which may be utilized in accordance with the embodiments of the present invention, may be found in the following U.S. Patents: U.S. Pat. No. 5,229,893, which issued to Dworatzek et al. on Jul. 20, 1993; U.S. Pat. No. 5,177,485, which issued to Daniel et al. on Jan. 5, 1993; and U.S. Pat. No. 5,184,179, which issued to Tarr et al. on Feb. 2, 1993.

Examples of circuit breakers, and components found therein, which may be utilized in accordance with the embodiments of the present invention, may be found in the following U.S. Patents: U.S. Pat. No. 4,750,375 to Godesa, entitled "Drive Device for a Circuit Breaker with a Ratchet Wheel"; U.S. Pat. No. 4,678,873 to Preuss and Berndt, entitled "Low Voltage Circuit Breaker . . . "; U.S. Pat. No. 4,380,785 to Demayer and Claudin, entitled "Solid State Trip Unit . . . "; U.S. Pat. No. 4,695,913 to Terracol and Roulet, entitled "Shunt Effect Low Voltage Circuit Breaker"; U.S. Pat. No. 5,296,664 to Crookston et al., entitled "Circuit Breaker with Positive Off Protection"; and U.S. Pat. No. 5,369,384 to Heins, entitled "Power Circuit Breaker with a Breaker Mechanism and a Breaker Mechanism for a Power Circuit Breaker".

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign and international patent publication applications, namely, Federal Republic of Germany Patent Application No. P 43 31 992.0, filed on Sep. 21, 1993, and International Application No. PCT/DE94/01077, having inventors Manfred Herkenrath, Paul Wey, Ferenc Boros, Dietrich Stade, and Holger Schau, and DE-OS 43 31 992.0 and DE-PS 43 31 992.0 and International Application No. PCT/DE94/01077, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. Substation for the distribution of electrical power, said substation having at least one possible location for the inadvertent generation of an arc, said substation comprising:
   means for receiving electrical power from at least one source;
   means for outputting electrical power to at least one destination;
   means for delivering electrical power from said receiving means to said outputting means; and
   means for detecting and extinguishing an arc that has been inadvertently generated within said substation;
   said detecting and extinguishing means comprising:
      an optical fiber conductor;
      said optical fiber conductor being disposed at least in part adjacent to said at least one possible location for the inadvertent generation of said arc; and
      high speed grounding means, said high speed grounding means comprising:
         energy storage means for storing electrical energy;
         a first cup-shaped short circuiting member;
         a second cup-shaped short circuiting member;
         vacuum means for maintaining a substantial vacuum surrounding said first and second cup-shaped short circuiting members;
         coil means substantially encircling said first and second cup-shaped short circuiting members;
         said coil means being electrically connected to said energy storage means; and
         means for actuating said high speed grounding means by causing transmission of said electrical energy stored in said energy storage means through said coil means;
         said coil means being disposed to induce a current in said first and second cup-shaped short circuiting members to thereby cause a metallic short circuit between said first and second cup-shaped short circuiting members.

2. The substation according to claim 1, wherein said substation comprises a low-voltage substation.

3. The substation according to claim 1:
   wherein at least a portion of said optical fiber conductor is of a color of at least one of blue and green.

4. The substation according to claim 1:
   wherein at least one substantial portion of said optical fiber conductor is of a blue color.

5. The substation according to claim 4:
   wherein said at least one substantial portion of said optical fiber conductor of a blue color comprises a jacket portion of said optical fiber; and
   said jacket portion of said optical fiber substantially surrounding a core portion of said optical fiber.

6. The substation according to claim 5, said substation additionally comprising:
   circuit breaker means for interrupting the flow of said electrical power;

said circuit breaker means being located electrically upstream of said at least one possible location for the inadvertent generation of said arc; and said circuit breaker means having a circuit breaking actuating time exceeding an allowable arcing time of said arc.

7. The substation according to claim 6:

wherein said high speed grounding means has a grounding actuation time;

wherein said circuit breaking time additionally exceeds said grounding actuation time of said high speed grounding means; and wherein said substation additionally comprises means for activating said circuit breaker means to interrupt the flow of said electrical power following actuation of said high speed grounding means.

* * * * *

UNITED STATES PATENT AND TRADEMARK OFFICE
CERTIFICATE OF CORRECTION

PATENT NO. : 5,650,902
DATED : July 22, 1997
INVENTOR(S) : Manfred HERKENRATH, Paul WEY, Ferenc BOROS, Dietrich STADE, Holger SCHAU It is certified that error appears in the above-identified patent and that said Letters Patent is hereby corrected as shown below:

In column 7, line 29, after 'groups', delete "H2.H8" and insert --H2.. H8--.

In column 12, line 63, after 'bus', delete "bare." and insert --bars.--.

Signed and Sealed this

Eleventh Day of November, 1997

Attest:

BRUCE LEHMAN

Attesting Officer

Commissioner of Patents and Trademarks